US012806570B2

(12) United States Patent
Oloman

(10) Patent No.: US 12,806,570 B2
(45) Date of Patent: Nov. 24, 2026

(54) ELECTROCHEMICAL HYDROXIDE AND CARBON DIOXIDE REGENERATION METHOD AND APPARATUS

(71) Applicant: 0798465 B.C. Ltd., Vancouver (CA)

(72) Inventor: Colin Oloman, Vancouver (CA)

(73) Assignee: 0798465 B.C. Ltd., Vancouver (CA)

( * ) Notice: Subject to any disclaimer, the term of this patent is extended or adjusted under 35 U.S.C. 154(b) by 979 days.

(21) Appl. No.: 18/012,604

(22) PCT Filed: Aug. 20, 2021

(86) PCT No.: PCT/CA2021/051159
§ 371 (c)(1),
(2) Date: Dec. 22, 2022

(87) PCT Pub. No.: WO2022/040784
PCT Pub. Date: Mar. 3, 2022

(65) Prior Publication Data
US 2023/0249133 A1 Aug. 10, 2023

Related U.S. Application Data

(60) Provisional application No. 63/069,302, filed on Aug. 24, 2020.

(51) Int. Cl.
*C25B 9/00* (2021.01)
*B01D 53/62* (2006.01)
(Continued)

(52) U.S. Cl.
CPC ........... *B01D 53/965* (2013.01); *B01D 53/62* (2013.01); *B01D 53/78* (2013.01); *B01D 61/42* (2013.01);
(Continued)

(58) Field of Classification Search
CPC ....... C25B 15/081; C25B 11/031; C25B 9/19; C25B 1/04; C25B 1/16; C25B 13/02;
(Continued)

(56) References Cited

U.S. PATENT DOCUMENTS 2,256,962 A 9/1941 Reich
2,377,823 A 6/1945 Stewart
(Continued)

FOREIGN PATENT DOCUMENTS

CN 101361216 A * 2/2009 ........ H01M 8/04119
WO WO2009/155539 A2 12/2009
(Continued)

OTHER PUBLICATIONS

Brown, George Granger., "Unit Operations," John Wiley, New York, 1956, pp. 210-228.
(Continued)

*Primary Examiner* — Zulmariam Mendez
(74) *Attorney, Agent, or Firm* — Klarquist Sparkman, LLP

(57) ABSTRACT

A method and system for electrochemically regenerating hydroxide (MOH) and carbon dioxide ($CO_2$) from an alkali metal carbonate ($M_2CO_3$) via an electrochemical reactor that can replace a conventional thermochemical causticizing operation in a DAC system. The electrochemical reactor comprises: a cathode having an inlet for receiving an electrolyte feed stream comprising MOH, $M_2CO_3$ and $H_2O$, and an outlet for discharging an electrolyte product stream comprising MOH, $M_2CO_3$, $H_2O$ and $H_2$; a porous hydrophilic transport barrier in adjacent contact with the cathode; a porous hydrophilic anode in adjacent contact with the transport barrier configured and operable to generate $CO_2$ in the presence of MOH while suppressing their recombination; a porous hydrophobic $CO_2$ and $O_2$ separation barrier in
(Continued)

adjacent contact with the anode; and a product gas exit channel in adjacent contact with the $CO_2$ and $O_2$ separation barrier and for discharging an anode product stream comprising at least $CO_2$.

20 Claims, 16 Drawing Sheets

(51) Int. Cl.

| | |
|---|---|
| ***B01D 53/78*** | (2006.01) |
| ***B01D 53/96*** | (2006.01) |
| ***B01D 61/42*** | (2006.01) |
| ***C25B 1/04*** | (2021.01) |
| ***C25B 1/16*** | (2006.01) |
| ***C25B 9/19*** | (2021.01) |
| ***C25B 11/031*** | (2021.01) |
| ***C25B 13/02*** | (2006.01) |
| ***C25B 15/08*** | (2006.01) |

(52) U.S. Cl.
CPC .................. *C25B 1/04* (2013.01); *C25B 1/16* (2013.01); *C25B 9/19* (2021.01); *C25B 11/031* (2021.01); *C25B 13/02* (2013.01); *C25B 15/081* (2021.01); *B01D 2251/304* (2013.01); *B01D 2251/604* (2013.01); *B01D 2251/606* (2013.01); *B01D 2257/504* (2013.01); *B01D 2258/06* (2013.01)

(58) Field of Classification Search
CPC ...... B01D 53/965; B01D 53/62; B01D 61/42; B01D 53/78; B01D 2251/304; B01D 2251/604; B01D 2251/606; B01D 2257/504; B01D 2258/06
See application file for complete search history.

(56) References Cited

U.S. PATENT DOCUMENTS

| | | | |
|---|---|---|---|
| 3,196,092 | A | 7/1965 | Beer |
| 3,344,050 | A | 9/1967 | Mayland et al. |
| 3,401,099 | A | 9/1968 | McEvoy |
| 3,401,100 | A | 9/1968 | Macklin |
| 3,494,842 | A | 2/1970 | De Respiris |
| 3,511,712 | A | 5/1970 | Giner |
| 3,519,488 | A | 7/1970 | Giner |
| 3,692,649 | A | 9/1972 | Prigent et al. |
| 3,990,912 | A | 11/1976 | Katz |
| 4,117,079 | A | 9/1978 | Bellows |
| 4,167,457 | A | 9/1979 | Giner |
| 4,197,421 | A | 4/1980 | Steinberg |
| 4,238,305 | A | 12/1980 | Gancy et al. |
| 4,337,126 | A | 6/1982 | Gilligan et al. |
| 4,561,945 | A | 12/1985 | Coker |
| 4,608,141 | A | 8/1986 | Chlanda et al. |
| 4,666,574 | A | 5/1987 | Oda et al. |
| 4,810,351 | A | 3/1989 | Chapoteau et al. |
| 5,141,620 | A | 8/1992 | Molter |
| 5,246,551 | A | 9/1993 | Pletcher et al. |
| 5,282,935 | A | 2/1994 | Cawlfield et al. |
| 7,094,329 | B2 | 8/2006 | Saha et al. |
| 8,871,008 | B2 | 10/2014 | Henderson et al. |
| 8,945,368 | B2 | 2/2015 | Rieke et al. |
| 9,267,211 | B2 | 2/2016 | Gilliam et al. |
| 9,637,393 | B2 | 5/2017 | Heidel et al. |
| 10,589,224 | B2 | 3/2020 | Verbakel et al. |
| 10,626,509 | B2 | 4/2020 | Kudo et al. |
| 10,865,490 | B2 | 12/2020 | Ono et al. |
| 2007/0045125 | A1 | 3/2007 | Hartvigsen et al. |
| 2007/0187247 | A1 | 8/2007 | Lackner et al. |
| 2008/0248350 | A1 | 10/2008 | Little et al. |
| 2009/0068502 | A1 | 3/2009 | Corrigan et al. |
| 2011/0108421 | A1 | 5/2011 | Lackner et al. |
| 2019/0240621 | A1 | 8/2019 | Torres et al. |
| 2019/0336909 | A1 | 11/2019 | Keith et al. |
| 2019/0359894 | A1 | 11/2019 | Heidel et al. |
| 2020/0087805 | A1 | 3/2020 | Ono et al. |
| 2021/0062351 | A1 | 3/2021 | Voskian et al. |

FOREIGN PATENT DOCUMENTS

| | | | |
|---|---|---|---|
| WO | WO2015/184388 | A1 | 12/2015 |
| WO | WO2017/207220 | A1 | 12/2017 |
| WO | WO2019/023414 | A1 | 1/2019 |
| WO | WO2019/051609 | A1 | 3/2019 |
| WO | WO2020/136211 | A1 | 7/2020 |
| WO | WO2020/163513 | A1 | 8/2020 |
| WO | WO2020/223804 | A1 | 11/2020 |

OTHER PUBLICATIONS

Burhenne et al., "Characterization of reactive CaCO3 crystallization in a fluidized bed reactor as a central process in direct air capture," J. Environ. Chem. Eng. 2017, 5(6), pp. 5968-5977.

Cong et al., "Enhanced permeability of mixed-matrix membranes for CO2 capture," Chem. Eng J., 2019, 8 pages.

Eisaman et al., "Energy-efficient electrochemical CO2 capture from the atmosphere," Clean Tech, 2009, 4 pages.

Figuieredo et al., "Semi-empirical modeling of the stationary state of a real causticizing system in a pulp mill," Latin American Appl Research, 2012, 42, pp. 319-326.

Giacomin et al., "Alkaline crystallization of CaCO3 in a direct air capture process," AICHE Conference, Pittsburgh, PA, 2018, 9 pages.

Han et al., "Recent Progress in the Engineering of Polymeric Membranes for CO2 Capture from Flue Gas", J. Membrane Sci. 2021, 25 pages.

Holmes et al., "An air-liquid contactor for large scale capture of CO2 from air," Phil. Trans Royal Soc, 2012, 370, pp. 4380-4403.

Iizuka et al., "Carbon dioxide recovery from carbonate solutions using bipolar membrane electrodialysis," Sep. and Purification Tech. 2012, 101, pp. 45-59.

Keener et al., "A review: Desorption of CO2 from rich solutions in chemical absorption processes," Int. J. Greenhouse Gas Control, 2016, 51, pp. 290-304.

Keith et al., "A process for capturing CO2 from the atmosphere," Joule 2, 1573-1594, pp. 2018.

Lui et al., "Hydrogen-motivated electrolysis of sodium carbonate with extremely low cell overvoltage," Chem. Commun., 2018, 19, pp. 3582-3585.

Mazzotti et al., "Direct air capture of CO2 with chemicals: Optimization of a two-loop carbonate system using a counter-current air-liquid contactor," Climate Change 2013, 18, pp. 119-135.

Mehmood et al., "A novel high performance configuration of electrochemical cell to produce alkali for sequestration of carbon dioxide," Electrochim. Acta. 2016, 219, pp. 655-663.

Muroyama et al., "Review-CO2 separation and transport via electrochemical methods," J. Electrochem. Soc. 2020, 167, 133504, 13 pages.

Norahim et al., "Recent membrane developments for CO2 separation and capture," Chem. Eng Tech., 2018, 41(2), pp. 211-223.

Pohoreck et al., "Kinetics of reaction between carbon dioxide and hydroxyl ions in aqueous electrolyte solutions," Chem. Eng Sci. 1988, 43(7), pp. 1677-1684.

Rheinhardt et al., "Electrochemical capture and release of carbon dioxide," ACS Energy letters, 2017, 2, pp. 454-461.

Sabatino et al., "Evaluation of a direct air capture process combining wet scrubbing and bipolar membrane electrodialysis," Ind. Eng. Chem. Res. 2020, 59, pp. 7007-7020.

Sharifan et al., "Electrochemical carbon dioxide capture in a close carbon cycle," Energy & Environ Sci. 2021, 14, pp. 781-814.

G.A. Smook, "Handbook for Pulp and Paper Technologists," CPPA, Montreal, 1989, title page and p. 140.

Stolaroff et al., "Carbon dioxide capture from atmospheric air using sodium hydroxide spray," Environ Science & Technology, Feb. 1, 2008, pp. S1-S12.

(56) References Cited

OTHER PUBLICATIONS

Stucki et al., "Coupled CO2 recovery from the atmosphere and water electrolysis: feasibility of a new process for hydrogen storage," Int. J. Hydrogen Energy, 1995, 20(8), pp. 653-663.
Yang et al., "Progress in carbon dioxide separation and capture," J. Environ Sci. 2008, 20, pp. 14-27.
Zeman et al., "Capturing carbon dioxide directly from the atmosphere," World Res. Review, 2004, 16(2), pp. 157-163.
Zeman et al., "Carbon neutral hydrocarbons," Phil. Trans. Royal Soc. A 2008, 366, pp. 3901-3918.

* cited by examiner

ELECTROCHEMICAL HYDROXIDE AND CARBON DIOXIDE REGENERATION METHOD AND APPARATUS

FIELD

This disclosure relates generally to a method and apparatus for electrochemically regenerating hydroxide and carbon dioxide from alkali metal carbonate, and its application to the capture of carbon dioxide directly from the atmosphere.

BACKGROUND

The accumulation of carbon dioxide ($CO_2$) in the atmosphere is an existential threat to life on Earth.

In the (likely) event that regulation and action fail to limit emissions from combustion of fossil fuel, the viability of civilization may depend on removing $CO_2$ directly from the atmosphere. This improbable engineering task is now being considered for application in the future.

Removal of carbon dioxide ($CO_2$) from the air (known as "Direct Air Capture" or "DAC") is currently viewed as a potential tool to curb the global warming caused by accumulation of $CO_2$ in Earth's atmosphere. DAC is a known process with several proposed methods. In typical DAC operations, ambient air is contacted with a chemical media such as an aqueous alkaline solvent or functionalized sorbent. One method of DAC under development involves a system wherein $CO_2$ is absorbed from the air to form an aqueous alkaline carbonate solution (Reaction 1) and subsequently recovered by the circuitous closed-loop thermochemical process summarized in Reactions 2, 3, 4:

| | | |
|---|---|---|
| $CO_2(g) + 2MOH(aq) \rightarrow M_2CO_3(aq) + H_2O(I)$ | Absorb | Reaction 1 |
| $M_2CO_3(aq) + Ca(OH)_2(s) \rightarrow 2MOH(aq) + CaCO_3(s)$ | Causticize | Reaction 2 |
| $CaCO_3(s) \rightarrow CaO(s) + CO_2(g)$ | Calcine (900° C.) | Reaction 3 |
| $CaO(s) + H_2O\ (I) \rightarrow Ca(OH)_2(s)$ | Slake | Reaction 4 |

Wherein, M=alkali metal=lithium (Li), sodium (Na), potassium (K), caesium (Cs) or rubidium (Rb).

The $CO_2$ product from Reaction 3 may be disposed "as is" or preferably converted to useful materials for sale. These options are known respectively as carbon capture and storage (CC&S) and carbon capture and conversion (CC&C). In the latter case the $CO_2$ may be combined with hydrogen by established methods to make fuels, or reduced to various products in electrochemical processes now under development [for example as disclosed in U.S. Pat. No. 4,197,421A and US 2019/0359894A].

The DAC process of Reactions 1-4 has been demonstrated on pilot scale with potassium hydroxide (KOH) absorbent and is considered feasible for large scale development [for example, as disclosed in WO2009155539A3]. However, coupling the fluid absorption with the solid-fluid causticizing system constrains optimization of the DAC process and its broad application is limited by the need to handle hot solids in large equipment not amenable to downscaling.

It is recognized that the DAC system could be simplified and more readily scaled down if the solid dependent regeneration of alkaline absorbent were replaced by a process treating only liquids and gases. Electrochemical methods have been investigated for this role but so far cannot be seen as useful alternatives to the established thermochemical route of Equations 2,3,4. These electrochemical methods essentially involve splitting an alkali metal carbonate (e.g. $K_2CO_3$) to give hydroxide (KOH) and carbon dioxide ($CO_2$) with the net result of Reaction 5.

$$M_2CO_3(aq)+H_2O(l)-2F\rightarrow 2MOH(aq)+CO_2(g) \quad \text{Reaction 5}$$

Wherein F=Faraday's number=96489 Coulomb per mole

The attraction of this method is that it could regenerate the absorbent (MOH) and produce $CO_2$ in a single step with only liquid and gas reactants/products at near ambient pressure and temperature. As usual in such cases it is easier to write Reaction 5 than to carry it out in reality with practical results. Nonetheless it remains a desirable goal to replace the thermochemical regeneration of absorbent in DAC with such an electrochemical process.

A primary objective of the present invention is to provide an electrochemical reactor and process to relax/remove the carbonate conversion causticizing constraint imposed by the thermochemical regeneration process in applications such as DAC, while optionally providing for the co-generation of hydrogen and integrated reduction of $CO_2$ to fuels.

SUMMARY

According to one aspect of the invention, there is provided an electrochemical reactor for regenerating an alkali metal hydroxide (MOH) and carbon dioxide ($CO_2$) from an alkali metal carbonate ($M_2CO_3$) when coupled to a power supply. The electrochemical reactor comprises a porous electronically conductive cathode, a porous electronically insulating hydrophilic transport barrier, a porous electronically conductive hydrophilic anode, a porous hydrophobic gas separation barrier, and a product gas exit channel. The porous electronically conductive cathode has an inlet for receiving a pressurized electrolyte feed stream comprising MOH, $M_2CO_3$ and $H_2O$, and an outlet for discharging an electrolyte product stream comprising MOH, $M_2CO_3$, $H_2O$ and $H_2$. The porous electronically insulating hydrophilic transport barrier is in adjacent contact with the cathode and is configured to regulate the transport of electrolyte species and impede gas flow across the transport barrier. The porous electronically conductive hydrophilic anode is in adjacent contact with the transport barrier and is configured to generate $CO_2$ in the presence of MOH while suppressing their recombination. The porous hydrophobic gas separation barrier is in adjacent contact with the anode and is configured to pass gases including $CO_2$ and suppress liquids. The product gas exit channel is in adjacent contact with the gas separation barrier and serves to discharge an anode product stream comprising at least $CO_2$ gas.

According to another aspect of the invention, there is provided an electrochemical reactor for regenerating MOH and $CO_2$ from $M_2CO_3$ when coupled to a power supply. The electrochemical reactor comprises an electrolyte flow channel, a porous electronically insulating hydrophilic first transport barrier, a porous electronically conductive hydrophilic cathode, a porous hydrophobic $H_2$ separation barrier, a cathode gas exit channel, a porous electronically insulating hydrophilic second transport barrier, a porous electronically conductive hydrophilic anode, a porous hydrophobic gas separation barrier, and an anode gas exit channel. The electrolyte flow channel has an inlet for receiving an electrolyte feed stream comprising MOH, $M_2CO_3$ and $H_2O$, and an outlet for discharging an electrolyte product stream comprising MOH, $M_2CO_3$, and $H_2O$. The porous electronically insulating hydrophilic first transport barrier is in adjacent contact with a first side of the electrolyte flow channel and is configured to regulate the transport of electrolyte species and impede gas flow across the first transport barrier. The porous electronically conductive hydrophilic cathode is in adjacent contact with the first transport barrier. The porous hydrophobic $H_2$ separation barrier is in adjacent contact with the cathode and is configured to pass gases including $H_2$ and suppress liquids. The cathode gas exit channel is in adjacent contact with the $H_2$ separation barrier and serves to discharge a cathode gas stream comprising $H_2$. The porous electronically insulating hydrophilic second transport barrier is in adjacent contact with a second side of the electrolyte flow channel and is configured to regulate the transport of electrolyte species and impede gas flow across the second transport barrier. The porous electronically conductive hydrophilic anode is in adjacent contact with the second transport barrier and is configured to generate $CO_2$ in the presence of MOH while suppressing their recombination. The porous hydrophobic gas separation barrier is in adjacent contact with the anode and is configured to pass gases including $CO_2$ and suppress liquids. The anode gas exit channel is in adjacent contact with the gas separation barrier and serves to discharge an anode product stream comprising at least $CO_2$.

The anode can comprise a biphilic morphology having heterogeneous surfaces with spatially distinct regions of wettability including hydrophilic components. More particularly, the anode can be a biphilic anode comprising multiple porous hydrophilic electrode portions separated by multiple hydrophobic gas disengagement channels and stacked parallel to a direction of electric current in the electrochemical reactor.

The anode can have a porosity from 10 to 90%, a pore size from 10 to 1000 micron, a thickness in direction of current from 0.2 to 20 mm, an air/water wetting angle from 0 to 89° and an air/water capillary pressure at or above 1 kPa. The gas separation barrier can have a porosity from 10 to 90%, a thickness from 0.1 to 5 mm, and a capillary pressure air/water from (−1) to (−30) kPa. The transport barrier can have a porosity from 10 to 90%, a thickness in a direction of current between 0.05 and 5 mm, and a coefficient of permeability (in Darcy equation) from 1E-14 to 1E-10 $m^2$. The alkali metal carbonate can have a total alkali metal (cation) concentration ranges from 0.1 to 10 molar. The alkali metal of the electrochemical reactor can comprise a cation selected from a group consisting of: sodium, potassium, rubidium and caesium, or a mixture thereof, and have a concentration in the range of 0.1 to 10 molar.

The electrochemical reactor can be a single-electrolyte flow chamber. The electrochemical reactor can further comprise an oxidation suppression barrier between the anode and the gas separation barrier that is composed of a porous electronically conductive and electrochemically inactive material. The electrochemical reactor can also comprise a porous electronically conductive connection plate and an $O_2$ or $CO_2$ selective membrane in adjacent contact with the product gas exit channel that serves to discharge $O_2$ or $CO_2$ gas from an $O_2$ or $CO_2$ gas exit channel.

Multiple electrochemical reactors can be combined into a stack. Discharged $O_2$ or $CO_2$ gas from a first electrochemical reactor in the stack can be fed to an adjacent second electrochemical reactor to depolarize a cathode of the second electrochemical reactor. In another electrochemical stack configuration, discharged gas stream comprising $H_2$ from a first electrochemical reactor in the stack can be fed to an adjacent second electrochemical reactor to depolarize and prevent electro-oxidative destruction of an anode of the second electrochemical reactor.

According to another aspect of the invention, there is provided a method for removing $CO_2$ from air comprising: contacting air with a regenerated absorbent in a $CO_2$ absorber to produce a spent absorbent comprising carbonate in an alkali metal hydroxide and carbonate solution; feeding the spent absorbent to the aforementioned electrochemical reactor and producing an anode product stream comprising at least $CO_2$ gas and an electrolyte product stream comprising alkali metal hydroxide and carbonate; and recycling the alkali metal hydroxide and carbonate from the electrolyte product stream into the regenerated absorbent for the $CO_2$ absorber. The regenerated absorbent can be an aqueous solution comprising alkali metal hydroxide and carbonate; the electrolyte product stream can further comprise hydrogen and the method can further comprise separating the hydrogen from the electrolyte product stream and separating and recovering the $CO_2$ gas from the anode product stream. The anode product stream can comprise $O_2$ gas in which case the method further comprises separating the $O_2$ gas from the anode product stream and discharging the $O_2$ gas to atmosphere.

The method can further comprise supplying an electrical current to the electrochemical reactor to produce an average superficial current density on the anode in the range of 1 to 10 $kA/m^2$ and an average current concentration in the porous anode in the range of 100 to 10,000 $kA/m^3$.

The method can further comprise feeding the spent absorbent and the electrolyte product stream to a mixer for mixing into a mixed stream, which flows to a flow divider that divides the mixed stream respectively to the $CO_2$ absorber as a regenerated absorbent stream and to the electrochemical reactor as an electrolyte feed stream. A feed rate of the electrolyte feed stream can be two to six times the feed rate of the regenerated absorbent stream. The alkali metal hydroxide and carbonate in the regenerated absorbent can have an $[OH—]/[CO_{3=}]$ ratio of in the range of 0.5 to 2.5 M/M, wherein the alkali metal hydroxide and carbonate in the produced electrolyte product stream has an $[OH—]/[CO_3{=}{=}]$ ratio in a range of 1 to 6 M/M.

According to another aspect of the invention, there is provided a direct air capture (DAC) system comprising an electrochemical reactor for regenerating MOH and $CO_2$ from $M_2CO_3$ when coupled to a power supply; and a $CO_2$ absorber. The electrochemical reactor comprises a porous electronically conductive cathode having an inlet for receiving a pressurized electrolyte feed stream comprising MOH, $M_2CO_3$ and $H_2O$, and an outlet for discharging an electrolyte product stream comprising MOH, $M_2CO_3$, $H_2O$ and $H_2$; a porous electronically insulating hydrophilic transport barrier in adjacent contact with the cathode and configured to regulate the transport of electrolyte species and impede gas flow across the transport barrier; a porous electronically conductive hydrophilic anode in adjacent contact with the transport barrier and configured to generate $CO_2$ in the presence of MOH while suppressing their recombination; a porous hydrophobic gas separation barrier in adjacent contact with the anode and configured to pass gases including $CO_2$ and suppress liquids; and a product gas exit channel in adjacent contact with the gas separation barrier that serves to discharge an anode product stream comprising at least $CO_2$ gas. The $CO_2$ absorber comprises an alkali metal hydroxide and carbonate absorbent for contacting with air to produce a spent absorbent comprising carbonate in an alkali metal hydroxide and carbonate stream. The $CO_2$ absorber further comprises an absorbent outlet fluidly coupled to the cathode inlet to supply the spent absorbent to the electrochemical reactor, and an absorber inlet fluidly coupled with the cathode outlet to receive the electrolyte product stream from the electrochemical reactor.

The DAC system can further comprise a mixer having inlets fluidly coupled to the absorbent outlet and the electrochemical reactor cathode outlet, wherein the spent absorbent stream and electrolyte product stream are mixed into a mixed stream; and a flow divider having an inlet fluidly coupled to the mixer to receive the mixed stream, and a pair of outlets for respectively discharging the mixed stream as a regenerated absorbent stream into the $CO_2$ absorber and as the electrolyte feed stream into the electrochemical reactor.

The anode product stream can comprise $O_2$ and $CO_2$ gases, in which case the DAC system can further comprise a $CO_2/O_2$ separator having an inlet fluidly coupled with the anode product stream and $CO_2$ and $O_2$ outlets for discharging $CO_2$ and $O_2$ gases respectively. The DAC system can further comprise an $H_2$ separator having an inlet fluidly coupled to the cathode outlet for receiving the electrolyte product stream, an $H_2$ outlet for discharging $H_2$ gas separated from the electrolyte product stream, and an alkali metal hydroxide and carbonate outlet fluidly coupled to the absorber inlet for discharging a metal hydroxide and carbonate stream; and an oxidation reactor coupled with the electrochemical reactor product gas exit channel or to the $CO_2/O_2$ separator $O_2$ outlet to receive the anode product stream or the $O_2$ gas as oxidant, and fluidly coupled with the separator $H_2$ outlet to receive the $H_2$ gas as fuel.

According to another aspect of the invention, there is provided a DAC system comprising: an electrochemical reactor for regenerating MOH and $CO_2$ from $M_2CO_3$ when coupled to a power supply, a $CO_2$ absorber, and an oxidation reactor. The electrochemical reactor is a single-electrolyte flow chamber electrochemical reactor comprising: an electrolyte flow channel having an inlet for receiving an electrolyte feed stream comprising MOH, $M_2CO_3$ and $H_2O$, and an outlet for discharging an electrolyte product stream comprising MOH, $M_2CO_3$, and $H_2O$; a porous electronically insulating hydrophilic first transport barrier in adjacent contact with a first side of the electrolyte flow channel and configured to regulate the transport of electrolyte species and impede gas flow across the barrier; a porous electronically conductive hydrophilic cathode in adjacent contact with the first transport barrier; a porous hydrophobic $H_2$ separation barrier in adjacent contact with the cathode and configured to pass gases including $H_2$ and suppress liquids; a cathode gas exit channel in adjacent contact with the $H_2$ separation barrier and for discharging a cathode gas stream comprising $H_2$; a porous electronically insulating hydrophilic second transport barrier in adjacent contact with a second side of the electrolyte flow channel and configured to regulate the transport of electrolyte species and impede gas flow across the barrier; a porous electronically conductive hydrophilic anode in adjacent contact with the second transport barrier configured to generate $CO_2$ in the presence of MOH while suppressing their recombination; a porous hydrophobic gas separation barrier in adjacent contact with the anode and configured to pass gases including $CO_2$ and $O_2$ and suppress liquids; and an anode gas exit channel in adjacent contact with the gas separation barrier and for discharging an anode product stream comprising at least $O_2$ and $CO_2$.

The $CO_2$ absorber comprises an alkali metal hydroxide and carbonate absorbent for contacting with air to produce a spent absorbent stream. The $CO_2$ absorber further comprises an absorber outlet fluid coupled with the electrolyte flow channel inlet to supply the spent absorbent stream into the electrolyte feed stream, and an absorber inlet fluidly coupled with the electrolyte flow channel outlet to receive the electrolyte product stream into the alkali metal hydroxide and carbonate absorbent. The oxidation reactor is coupled with the anode gas exit channel to receive the anode product stream as oxidant, and is fluidly coupled with the cathode gas exit channel to receive the cathode gas stream as fuel. The oxidation reactor can be, for example, a fuel cell or a gas burner.

DETAILED DESCRIPTION OF EMBODIMENTS

Figure 1:
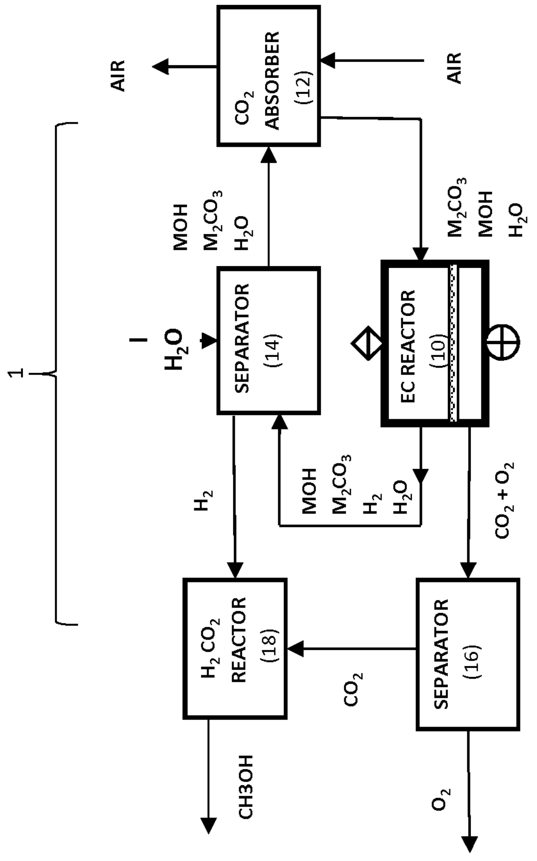
FIG. 1 is a schematic DAC system diagram, which includes an electrochemical reactor for recovering MOH and $CO_2$ from $M_2CO_3$ according to embodiments of the invention.

Embodiments of the invention comprise an electrochemical reactor in which a carbonate containing electrolyte contacts a hydrophilic transport barrier (not an ion-exchange membrane) covering a porous anode backed by a hydrophobic gas separation barrier. In this context, "transport" includes convection, diffusion and ion migration which all contribute to the transfer of species between (to and from) the cathode and anode, "hydrophilic" means an air/water contact angle less than 90° and typically less than 10°, and "hydrophobic" means an air/water contact angle greater than 90° and typically greater than 1100. In operation of the reactor, an electrolyte solution penetrates the hydrophilic transport barrier to reach the anode where water is oxidised by Reaction 6:

$$H_2O(l)\rightarrow 2H+(aq)+\tfrac{1}{2}O_2(g)+2e- \quad \text{Reaction 6}$$

The pH of the bulk electrolyte in the anode may be well above 6 but near the anode surface a pH below 6 can promote generation of $CO_2$ by net Reaction 7, from which it may recombine with hydroxide in the thermochemical Reaction 8 ("near" means within about 100 microns of the anode surface, i.e. the "Nernst diffusion layer" at the solid/liquid interface):

$$CO_3{=}(aq)+2H+(aq)\rightarrow CO_2(aq)+H_2O(l)+CO_2(g)+H_2O(l) \quad \text{Reaction 7}$$

$$CO_2(aq,g)+2OH—(l)\rightarrow CO_3{=}(aq)+H_2O(l) \quad \text{Reaction 8}$$

Wherein $CO_2$(aq,g) means $CO_2$ in solution and/or the gas phase

Electrochemical reactors (a.k.a. "cells") referred herein use three-dimensional (3D) electrodes and the current density (CD) is reported as the superficial current density. The superficial (a.k.a. "geometric") CD is the ratio of current to electrode area averaged over the external surface of the electrode, not to be conflated with the lower "real" CD on the internal surface area of the electrode. The unit of CD used here is kiloAmpere per square meter=$kA/m^2$ Where: 1 $kA/m^2$=1000 $A/m^2$=100 $mA/cm^2$ Since it is determined by a sequence of electrochemical (Faradaic) and thermochemical reactions the efficiency of the electrochemical process is measured/represented here not as the Faradaic efficiency (FE) but as the "current efficiency" (CE) where:

CE=(amount of product)/(stoichiometric equivalent of electric charge consumed)

e.g. CE for hydroxide (OH—)=(moles OH— produced)/(Faradays of charge consumed)

The current efficiency for both $CO_2$ and hydroxide in the overall process is expected to depend on the relative rates of reactions 6 to 8, together with the rates of mass transfer of $CO_2$ between phases and of its escape from the anode via the hydrophobic barrier.

Without being bound by theory, it is expected that current efficiency would depend on the current density, current concentration and ease of $CO_2$ disengagement from the anode. Current concentration is the ratio of current to the pore volume of the anode and can be estimated with Equation 1:

$$CC=CD/(et) \quad \text{Equation 1}$$

Where:

| | |
|---|---|
| CC = current concentration | $kA/m^3$ |
| CD = superficial current density | $kA/m^2$ |
| e = electrode porosity | (−) |
| t = electrode thickness | m |

Both the current density and current concentration may be involved because electrochemical and thermochemical reactions 6 and 7 generating protons and $CO_2$ happen at or near the solid electrode surface while thermochemical reactions consuming $CO_2$ occur in the volume of entrained fluids. The subsequent disengagement of $CO_2$ from the anode would depend in part on factors affecting multiphase fluid motion in porous solids, such as the liquid properties and the porosity, pore size, and contact angle in the solid.

Other factors likely to affect reactor performance include:

Electrolyte temperature

Electrolyte composition, particularly the hydroxide concentration and hydroxide/carbonate ratio Electrolyte properties, density, viscosity, surface tension, conductivity, etc.

Thickness, porosity, pore size, permeability and electronic conductivity of reactor components Surface properties—contact angles, wettability and wetting rates of reactor components Electrocatalysts on anode and/or cathode Pressure and pressure differentials in reactor Electronic contact resistance between components.

Considering that the irreversible second order thermochemical Reaction 8 is known to be fast (k=2E4 $m^3$/kmol·s at 20° C. with activation energy=45 kJ/mol), one may expect this method would not achieve a useful conversion of carbonate to hydroxide. On the contrary, it was discovered that in embodiments of the invention having certain materials and conditions, the carbonate conversion with the electrochemical reactor can match or exceed that obtained in the thermochemical DAC causticizing process.

Embodiments of the invention have particular application to DAC systems. The performance and cost of DAC systems depend on many factors, one of which is the composition of the recycling alkaline absorbent. The usual absorbent is a solution of alkali metal hydroxide and carbonate in water. The alkali metal cation may be sodium (Na+), potassium (K+) or potentially caesium (Cs+). Lithium and rubidium are outliers here because $Li_2CO_3$ is relatively insoluble and $Rb_2CO_3$ relatively expensive. Potassium hydroxide and carbonate are more costly than corresponding sodium compounds but are preferred for their relatively high solubility in water and fast kinetics of the stepwise reactions 9 and 10 culminating in Reaction 8:

$$OH—+CO_2\rightarrow HCO_3— \quad \text{Reaction 9}$$

$$HCO_3—+OH—\rightarrow CO_3{=} \quad \text{Reaction 10}$$

However sodium hydroxide/carbonate is satisfactory and even the more costly rubidium or caesium hydroxides/carbonates may be considered for applications requiring superior solubility, ionic strength and perhaps reactivity.

Regeneration of the alkaline absorbent by the causticizing Reaction 2 is critical to the thermochemical DAC process. Causticizing is a standard operation in the pulp and paper industry characterized by the conversion of carbonate to hydroxide, called the "causticizing efficiency" which ranges from about 70-90%. The causticizing efficiency relates to the equilibrium conversion in Reaction 2 and rests on the hydroxide/carbonate concentration ratio [OH—]/[$CO_3$=], such as disclosed by Figuieredo L. et al., *Semi-empirical modeling of the stationary state of a real caustizing system in a pulp mill*", Latin American Appl Research, 2012, 42, 319-326. Apart from the thermodynamic constraint on the [OH—]/[$CO_3$=] ratio the thermochemical causticizing efficiency is restricted by reaction kinetics, as well as the presence of impurities affecting the morphology and subsequent thermal decomposition of calcium carbonate. Consequently, the design and optimization of the integrated thermochemical DAC system must consider the causticizing process, implicating the total alkali metal concentration [M+] and the [OH—]/[$CO_3$=] causticizing ratio, which together fix the carbonate conversion and absorbent hydroxide concentration [OH—] via Equations 2 and 3:

$$X=(R_f-R_i)/(2+R_f) \quad \text{Equation 2}$$

$$[OH—]=RY/(2+R) \quad \text{Equation 3}$$

Where:

| | |
|---|---|
| X = carbonate conversion = $\{[CO_3{=}]_i - [CO_3{=}]_f\}/[CO_3{=}]_i$ | — |
| $[CO_3{=}]_i$, $[CO_3{=}]_f$ = initial, final carbonate concentration | M |
| R = [OH—]/$[CO_3{=}]$ hydroxide/carbonate ratio | M/M |
| $R_i$ = initial [OH—]/$[CO_3{=}]$ $R_f$ = final [OH—]/$[CO_3{=}]$ | M/M |
| Y = [M+] total cation concentration | M |

For example, U.S. Pat. No. 9,637,393 describe a fluidized pellet bed causticizing reactor with hydroxide and carbonate concentrations ranging respectively from 0.5 to 1.5 M and 0.2 to 0.9 M, corresponding to [OH—]/$[CO_3{=}]$ ratios from about 2.5 to 1.7 M/M and a carbonate conversion up to about 40%. The related DAC work of Keith et al. *A process for capturing $CO_2$ from the atmosphere*, Joule 2 2018, 1573-1594 indicates KOH and $K_2CO_3$ concentrations ranging respectively from about 0.7-1.1 M and 0.5-0.7 M with a total [K+] near 2 M, [OH—]/$[CO_3{=}]$ from about 2.4 to 1.0 and corresponding carbonate conversion in Reaction 2 about 30%.

According to Stolaroff *Carbon dioxide capture from atmospheric air using sodium hydroxide spray*, Environ Sc & Tech 2008, 42(8), 2728-2735 and Mazzotti *Direct air capture of CO2 with chemicals: Optimization of a two-loop carbonate system using a counter-current air-liquid contactor*, Climate Change 2013, 18, 119-135, the size and cost of a $CO_2$ absorber in DAC depends largely on the rate of absorption of $CO_2$ into the alkaline absorbent, which is governed by the combined effects of $CO_2$ gas-liquid mass transfer and the rate of Reactions 9/10. Mass transfer rates involve fluid-dynamic effects dependent on the diffusivity of $CO_2$ together with the density, viscosity and surface tension of the absorbent solution. The more important kinetics of Reactions 9/10 are reported by Pohoreck, *Kinetics of reaction between carbon dioxide and hydroxyl ions in aqueous electrolyte solutions*, Chem. Eng Sci. 1988, 43(7), 1677-1684 to be controlled by Reaction 9 with an activation energy of about 45 kJ/mol and second order rate constant at 20° C. ranging from about [1-3] E4 $m^3$/kmol·s, dependent on the ionic strength of the solution, as given by the simplified Equation 4:

$$\mathrm{Log}[k/k^*]=bI \quad \text{Equation 4}$$

Where:

| | | |
|---|---|---|
| k = | reaction rate constant | $m^3$/kmol · s |
| k* = | rate constant at infinite dilution | $m^3$/kmol · s |
| b = | constant function of specific ion contributions | 1/M' |
| I = | ionic strength of solution = $0.5[\mathrm{Sum}\{z_i^2 m_i\}]$ | M' |
| $z_i$ = | ion charge | — |
| $m_i$ = | ion molality | M' |

The NaOH/$Na_2CO_3$ and KOH/$K_2CO_3$ solutions reported by Pohoreck, of ionic strength=1 to 5 M', correspond approximately to the composition of DAC absorbents, with the implication that the rate of $CO_2$ absorption in DAC increases with ionic strength of the absorbent. This information on kinetics is relevant to embodiments of the present invention because it points to the [OH—]/$[CO_3{=}]$ ratio and total cation concentration [M+] with the coupled hydroxide concentration [OH—] as variables in the design and optimization of the DAC process.

Referring now to FIGS. 1 to 8, embodiments described herein relate generally to a method and system for electrochemically regenerating hydroxide (MOH) and carbon dioxide ($CO_2$) from an alkali metal carbonate ($M_2CO_3$). The alkali metal can comprise a cation selected from a group consisting of: sodium, potassium, rubidium and caesium, or a mixture thereof, and have a concentration in the range of 0.1 to 10 molar. The electrochemical regenerating method is carried out by an electrochemical reactor that replaces a conventional thermochemical causticizing operation in a DAC system. The electrochemical reactor can be operated at pressures below about 300 kPa(abs) and temperatures below about 110° C. using electricity from a renewable energy source. Direct Air Capture systems using such an electrochemical reactor may provide an effective means to reduce $CO_2$ accumulation in Earth's atmosphere.

Referring to FIG. 1, an electrochemical reactor 10 can be integrated into a DAC system 1 that uses an absorbent solution having a mixture of alkali metal hydroxide and carbonate (MOH and $M_2CO_3$) with concentrations respectively about 8 to 0.4 and 0.2 to 4 molar. Ambient air makes contact with the absorbent solution in a $CO_2$ absorber 12, which absorbs $CO_2$ from the air and produces carbonate. The produced carbonate is part of a spent absorbent stream ($M_2CO_3$, MOH) that is fed to the electrochemical reactor 10 as an electrolyte feed stream; in this context "spent absorbent" means absorbent depleted in MOH by the conversion to $CO_3{=}$ in Reaction 1 with $CO_2$. In this case the absorber functions in series with the electrochemical reactor 10 which generates a $[MOH+M_2CO_3+H_2O+H_2]$ electrolyte product stream and a $[CO_2+O_2]$ gas product stream. The MOH electrolyte product stream is fed to a hydrogen separator 14 which extracts hydrogen gas and returns the MOH and $M_2CO_3$ back to the $CO_2$ absorber 12 as the regenerated absorbent. The separator 14 also receives the water ($H_2O$) required to close the process water balance. The $[CO_2+O_2]$ gas product stream is fed into a $CO_2$ separator 16 which produces separate $CO_2$ and $O_2$ streams. The $CO_2$ is fed into a methanol reactor 18 which combines the $CO_2$ with the hydrogen gas produced by the hydrogen separator 14 to produce methanol ($CH_3OH$). Alternatively the $CO_2$ and hydrogen may be fed to a syngas generation reactor or a Fischer-Tropsch process to produce synthetic fuels. Alternatively, the $CO_2$ may be fed to an electrochemical reactor to produce useful materials such as carbon monoxide (CO), formic acid ($H_2CO_2$), ethylene ($C_2H_4$), etc. by methods known to the art. In yet another alternative embodiment, the $H_2$ gas and the $O_2$ stream (or the $[CO_2+O_2]$ gas product stream) may be fed to an oxidation reactor (e.g. fuel cell or gas burner, not shown) as fuel and oxidant respectively.

As will be described in detail below, the electrochemical reactor 10 can match the DAC absorbent compositions and allow their manipulation to optimize the overall DAC process.

Figure 2:
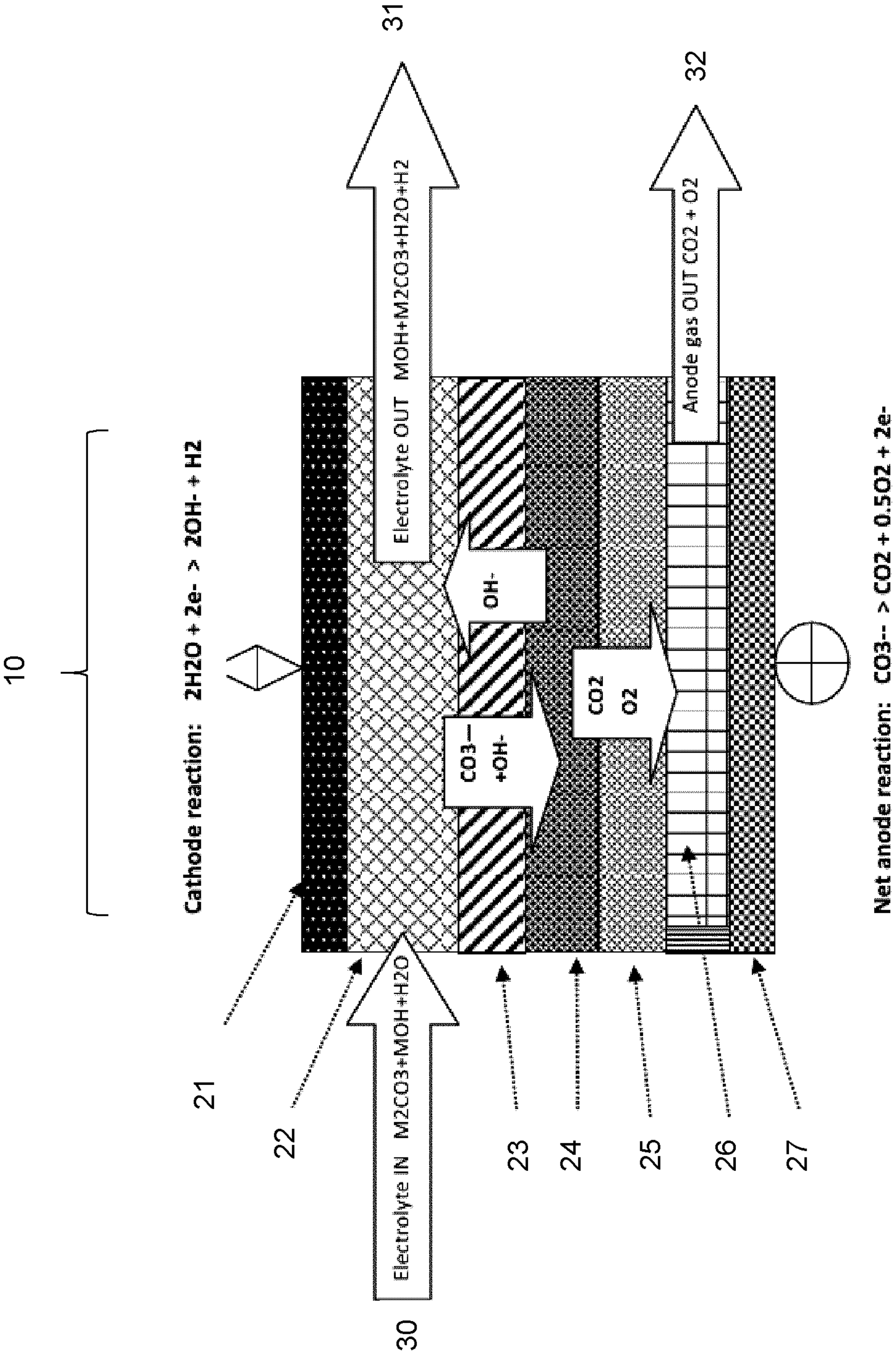
FIG. 2 is a schematic illustration of a single cell electrochemical reactor for recovering MOH and $CO_2$ from $M_2CO_3$ according to a first embodiment, wherein the reactor delivers a mixture of [$MOH+M_2CO_3+H_2O$] solution and $H_2$ gas, along with a [$CO_2+O_2$] gas product stream.

Referring now to FIG. 2 and according to a first embodiment, a single cell electrochemical reactor 10 (i.e. a reactor having only one anode-cathode pair) comprises a plurality of contacting layered components, namely; a cathode feeder 21, a porous electronically conductive cathode 22, a porous electronically insulating hydrophilic transport barrier 23, a porous electronically conductive hydrophilic anode 24, a porous hydrophobic $[CO_2+O_2]$ gas separation barrier 25, a product gas exit channel 26 and an anode feeder 27. These components are pressed tightly together between endplates interconnected by bolts (not shown); electrical connectors (not shown) connect to the cathode feeder 21 and anode feeder 27 and to a DC power supply (not shown) which supplies power for the electrochemical reactions. The cathode 22 has an inlet at one end to receive an electrolyte feed stream 30 comprising MOH, $M_2CO_3$ and $H_2O$, and an outlet at another end to discharge an electrolyte product stream 31 (otherwise referred to as "cathode product stream") comprising MOH, $M_2CO_3$, $H_2O$ and $H_2$. The anode 24 has an outlet to discharge a $[CO_2+O_2]$ gas product stream 32 comprising mixed $CO_2$, $O_2$ and $H_2O$. Gaskets (not shown) are provided in between components 21, 22, 23, 24, 26, 27 to direct fluid flows and prevent leakage.

Figure 4:
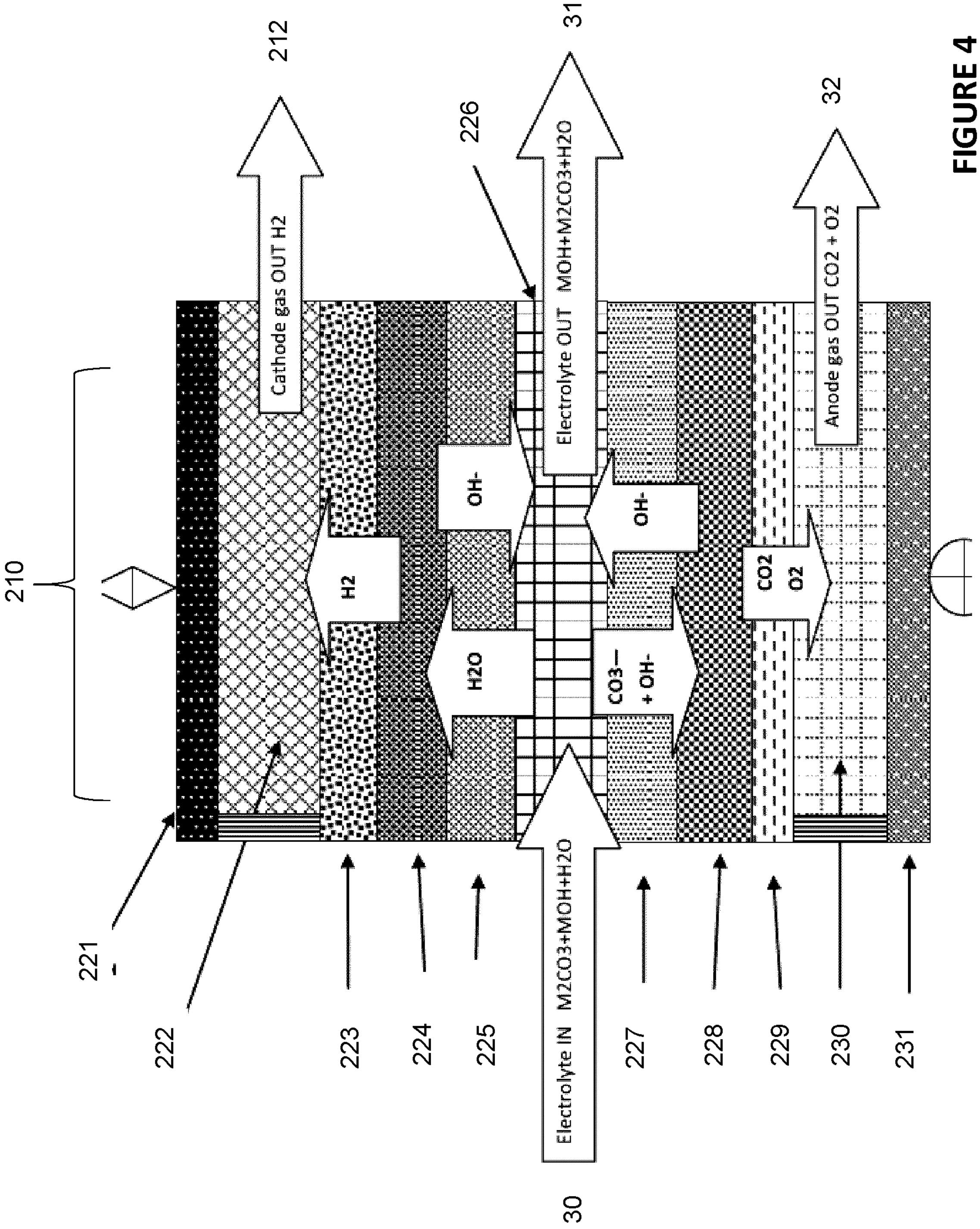
FIG. 4 is a schematic illustration of an electrochemical reactor for recovering MOH and $CO_2$ from $M_2CO_3$ according to a third embodiment, wherein the reactor delivers a [$MOH+M_2CO_3+H_2O$] solution, an $H_2$ gas product stream and a [$CO_2+O_2$] gas product stream.

Although there is electrolyte in both the cathode and anode, the electrochemical reactor can be considered to have a single-electrolyte flow chamber, since only one electrolyte solution enters, flows through and leaves the reactor via a single chamber, which may be the cathode 22 of the first and second embodiments (FIG. 2,3,) or the electrolyte flow channel 226 of the third embodiment (FIG. 4). Components of the electrolyte solution are transported to adjacent electrodes consuming $CO_3$═ and $H_2O$ and generating OH—, $H_2$, $CO_2$ and $O_2$. These processes occur at net rates to match the current density, with the flow and composition of exiting electrolyte solution determined by the corresponding reaction stoichiometries corrected for water losses by evaporation into the product gases.

For large scale operations such single cell, single-electrolyte flow chamber reactors, each with one anode-cathode pair, can be assembled in multi-cell stacks to operate in mono or bipolar mode with inter-cell fluid flows in parallel or in series.

The cathode and anode feeders 21, 27 are composed of an electronically conductive material such as stainless steel, graphite, nickel, or titanium. The cathode 22 has a porous three-dimensional structure and can for example be comprised of multiple layers of expanded nickel mesh. The porous hydrophilic transport barrier 23 serves to modulate transport to/from the anode 24 by convection, diffusion and ion migration and can comprise an electronically non-conductive microporous hydrophilic material such as hydrophilic polypropylene (e.g. SciMAT™, Vilidon™, Celgard™), borosilicate glass, asbestos, PES (polyethersuphone), hydrophilic PTFE, Zircar™ (zirconium oxide cloth) or Zirfon Perl™ (zirconium oxide in a polymer matrix); the material is an electronic insulator, made ionically conductive by absorbed electrolyte. The hydrophilic transport barrier 23 can have an air/water capillary pressure at least 1 kPa at 20° C., to impede anode gases from "backing up" into the cathode 22 and vice versa, and a permeability chosen to suppress/regulate the transport of electrolyte into the anode 24.

A limited transport (including convection, diffusion and migration) of electrolyte, water and/or ions into the anode 24 is needed to sustain the anode reactions. Such transport can be partly regulated by the permeability and thickness of the transport barrier 23, and the pressure difference between the cathode 22 and anode 24, as given in the Darcy equation—Equation 5:

$$Q=-(KA/u)(dP/(dL)\qquad\text{Equation 5}$$

Where:

| | |
|---|---|
| Q = fluid flow rate | $m^3/s$ |
| K = coefficient of permeability | $m^2$ |
| A = flow area | $m^2$ |

-continued

| | |
|---|---|
| u = fluid viscoscity | kg/ms |
| dP/(dL = pressure gradient | Pa/m through the barrier |

The thickness and permeability of the transport barrier 23 is chosen to balance its ionic resistance with its role in regulating mass transport between cathode and anode. The barrier can comprise single or multiple layers with total thickness from about 0.05 and 5 mm and more particularly from 0.1 to 5 mm, a porosity from 10 to 90% and an effective coefficient of permeability about 1E-10 to 1E-14 $m^2$.

The anode 24 has a porous three-dimensional structure and can comprise an electronically conductive fine mesh, felt, sintered fibre/particulate or foam of resistant material such as titanium or Ebonex ($Ti_4O_7$), with a catalytic surface for electro-oxidation of water at a pH below 12, such as ruthenium/iridium oxide, platinum, $Ti_4O_7$ or boron-doped diamond. The anode 24 may have a range of capillary properties but preferably a positive air/water capillary pressure to maintain contact with the aqueous electrolyte and suppress $CO_2$ gas back-up into the cathode 22. In some embodiments, the anode 24 can have a porosity from 10 and 90%, a pore size from 10 to 1000 micron, a thickness of 0.2 to 20 mm, a specific surface area at least about 5000 $m^{-1}$, an air/water wetting angle from 0 to 89° and an air/water capillary pressure at or above 1 kPa.

The porous hydrophobic $[CO_2+O_2]$ gas separation barrier 25 serves to disengage carbon dioxide and oxygen gas from the hydroxide/carbonate electrolyte in the anode 24, and can comprise an electronically conductive or non-conductive microporous hydrophobic material, such as: a highly Teflonated (e.g. 50 wt % PTFE) gas transport layer (e.g. Spectracarb, Toray and other carbon papers known in the art), or a fine metal foam (e.g. nickel, titanium with >50 pores per inch) coated with a hydrophobic material like PTFE, or alternatively a microporous hydrophobic material such as PTFE alone. The $[CO_2+O_2]$ gas separation barrier 25 may be composed of an electronic conductor or insulator material. An electronic conductor material is preferred but if the $[CO_2+O_2]$ gas separation barrier 25 is composed of an electronically non-conductive material, an electronic connecter (not shown) is provided to electronically connect the anode feeder 27 and anode 24. The $[CO_2+O_2]$ gas separation barrier 25 should have a high contact (wetting) angle and negative capillary pressure with water (preferably greater than about 100° and more negative than about −5 kPa) to stop/suppress electrolyte liquid transport from the anode 24 into the product gas exit stream 26, and may be treated with a super-hydrophobic substance such as one of the fluorinated organic compounds sold under the trade-name Cytonix™ (e.g. Cytonix PFC602A). A high selectivity (preferably above 99%) of gas vs. liquid is desired for 25 to prevent losses of hydroxide and $CO_2$ in the process. In some embodiments, the gas separation barrier 25 can have a porosity from 10 to 90%, a thickness from 0.1 to 5 mm, and a capillary pressure air/water from (−1) to (−30) kPa.

Capillary pressure in this case is the pressure required for a liquid to penetrate a porous material and is estimated by the Young-Laplace (Equation 6):

$$P=2Y\cos\theta/r\qquad\text{Equation 6}$$

Where:

| | |
|---|---|
| P = capillary pressure | Pa |
| Y = surface tension of the liquid | $N/m^2$ |

-continued

| | |
|---|---|
| θ = contact angle of liquid on solid | degrees |
| r = pore radius in solid | m |

The contact angle of liquid water against air on a hydrophobic solid exceeds 90° so the capillary pressure has a negative value, the absolute value of which is effectively the pressure required to force liquid into/through the pores of the solid, known as the "breakthrough pressure". With hydrophilic solids the contact angle is below 90° and the positive water/air capillary pressure is effectively the pressure required to force air (gas) into/through the liquid saturated pores, which is the "bubble-point" of a porous membrane.

In one example, the electrochemical reactor 10 has a "zero-gap" single-electrolyte chamber cell wherein the micro-porous hydrophilic transport barrier 23 is alkali resistant with a thickness about 0.1 to 1 mm, and bubble-point above about 2 kPa the anode 24 is porous and hydrophilic with a thickness about 1 to 10 mm and a specific surface area at least about 5000 $m^{-1}$, and the hydrophobic gas separation barrier 25 is micro-porous and has thickness of about 0.1 to 2 mm and breakthrough pressure above about 2 kPa (absolute value).

In operation, the electrochemical reactor 10 generates MOH and $CO_2$ from the electrolyte feed stream 30 according to the electrochemical process:

$$M_2CO_3+2H_2O\text{---}2e^-\rightarrow 2MOH+CO_2+H_2+0.5O_2 \quad \text{Reaction 11}$$

wherein the reaction at the cathode 22 is:

$$2H_2O+2e^-\rightarrow 2OH^-+H_2 \quad \text{Reaction 12}$$

and the net reaction at the anode 24 is:

$$CO_3^{=}\rightarrow CO_2+0.5O_2+2e^- \quad \text{Reaction 13}$$

Pressure differentials across the cathode 22, transport barrier 23, anode 24, [$CO_2$+$O_2$] gas separation barrier 25, and product gas exit channel 26 under operating conditions should be maintained to effect the desired phase separations while accommodating the thickness, porosity, pore size, permeability and surface properties of these components 22, 23, 24, 25, 26. The electrolyte space velocity (a.k.a. flow) is set through the material balance to match the reaction stoichiometry(s) and carbonate conversion.

Without being bound by theory, it is supposed that when current flows from the power supply, carbonate, hydroxide, water and cations are transported from the electrolyte in the cathode 22, across the porous hydrophilic transport barrier 23, and into the anode 24 where they are involved in a sequence of electrochemical and thermochemical reactions. The electrochemical Reaction 14 oxidizes water to generate protons (H+), while the thermochemical Reaction (15), which is favored by increased temperature, produce liquid $H_2O$ and gaseous $CO_2$.

$$H_2O\rightarrow 2H^++0.5O_2+2e- \quad \text{Reaction 14}$$

$$2H^++CO_3^{=}\rightarrow H_2CO_{3(aqueous)}\rightarrow CO_{2(gas)}+H_2O_{(liq)} \quad \text{Reaction 15}$$

The hydrophobic [$CO_2$+$O_2$] gas separation barrier 25 allows the passage of $CO_2$ and $O_2$ to the product gas exit channel 26 but prevents electrolyte solution (with carbonate and hydroxide) from leaking through into the product gas exit channel 26 and recombining with the product $CO_2$.

The anode 24 generates $CO_2$ in the presence of hydroxide while suppressing their recombination. The distribution and relative rates of reactions and processes are arranged to suppress the generated $CO_2$ from reacting with the hydroxide at the anode surface to reproduce carbonate (undesirable), and to encourage $CO_2$ disengagement from the anolyte/anode and passage through the hydrophobic [$CO_2$+$O_2$] gas separation barrier 25 and to the product gas exit channel 26 (desirable). The distribution and rates of the electrochemical reaction(s) in the anode 24 depend on the superficial current density, current concentration and electronic & ionic conductivities of the anode and electrolyte, as well as the anode catalyst, specific surface, porosity and pore size distribution. The rate of the thermochemical reactions in the electrolyte depends on the reactant concentrations, temperature and the volume of electrolyte in and around the anode 24 (a.k.a. the electrolyte hold-up) which in turn depends on the thickness, porosity and wettabilities of the hydrophilic transport barrier 23 and the anode 24, as well as any extraneous fluid volume between the hydrophilic transport barrier 23 and the [$CO_2$+$O_2$] gas separation barrier 25 in which $CO_2$ may recombine with the electrolyte by Reaction 8.

It is theorized that $CO_2$ recovery can be increased by increasing the superficial current density and/or current concentration, decreasing the electrolyte hold-up in the hydrophilic transport barrier 23, anode 24 and [$CO_2$+$O_2$] gas separation barrier 25, promoting fast disengagement of the gas from the anode 24 into the [$CO_2$+$O_2$] gas separation barrier 25 and preventing electrolyte leakage through the [$CO_2$+$O_2$] gas separation barrier 25. It is proposed that gas disengagement may be assisted by constructing the porous anode with a biphilic morphology that allows in-situ partitioning of gas and liquid, for example with large (e.g. 100 um) hydrophilic pores coupled to small (e.g. 1 um) hydrophobic pores, wherein "biphilic" means having heterogeneous surfaces with spatially distinct regions of wettability including hydrophilic components. Correspondingly, this phase separation effect may be obtained with a stack of hydrophilic porous electrodes alternating with porous hydrophobic gas channels oriented parallel to the direction of current in the electrochemical reactor.

It is further supposed that performance of the single-chamber reactor 10 depends on the combined behaviour of the hydrophilic transport barrier 23, the anode 24 and the hydrophobic gas separation barrier 25, collectively referred to here as the "anode/separator assembly". When the carbonate conversion exceeds zero the hydrophilic barrier 23 regulates the transport of hydroxide, carbonate and water from cathode to anode and prevents the flow of gas from cathode 22 to anode 24 and vice versa, while the hydrophobic barrier 25 prevents electrolyte leakage into the [$CO_2$+$O_2$] gas product 26-32. This reactant partitioning and phase separation is realized by the capillary properties of the barriers 23 and 25 and driven by pressure differences between the anode/separator assembly, the cathode 22 and the [$CO_2$+$O_2$] gas product 26. Improper control of the pressures may drive $H_2$ gas into the anode 24 and/or $CO_2$ gas into the cathode 22 and/or liquid electrolyte into the product gas chamber 26 with consequent loss of the process efficiency. Performance may also be affected by multi-phase fluid dynamics in the cathode 22, where the volumetric gas/liquid flow ratio can exceed 1 at high current density, with consequences for the effective conductivity of the electrolyte and pressure profile in the cathode.

The electro-active anode 24 has a key role in the generation and separation of the product gas 32. Under operating conditions the pH of bulk electrolyte in the anode is presumably between about 7 and 14 while the pH at/near the anode surface can be below about 6. In that case water is oxidised to protons on the anode surface by the electrochemical Reaction 14 followed by the conversion of carbonate to $CO_2$ in the thermochemical Reaction 15, while $CO_2$ may revert to carbonate/bicarbonate in the parallel thermochemical Reaction 8:

The disposition of the reactions depends on a number of factors known in the art to affect the potential and current distribution in 3D electrodes, for example: the anode electrocatalyst, electronic conductivity, thickness, porosity, pore size and pore surface contact angle, as well as the liquid hold-up and ionic conductivity of the electrolyte and the pressure and temperature dependent kinetics of the multiphase thermochemical reactions.

Apart from process dynamics, the practical long term (i.e. commercial) operation of the reactor must account for the electrode potential distribution through the anode which may result in electro-oxidizing conditions at the anode—hydrophobic barrier 24-25 interface. A consequent oxidation of the substrate (e.g. carbon, nickel) and/or hydrophobic constituents of the barrier (e.g. PTFE) can lower its (absolute) capillary pressure and allow electrolyte to pass into the [$CO_2$+$O_2$] gas product chamber 26. To prevent this undesired effect the anode 24 should be devised with an electrocatalyst, thickness, porosity and conductivity sufficient to keep the potential of the hydrophobic barrier 25 below a destructive value over the operating range of the reactor, particularly with superficial current densities above 1 kA/$m^2$. Alternatively the hydrophobic barrier 25 can be protected against oxidation by a layer of porous electronically conductive but electrochemically inactive material, for example a "valve metal" such as titanium, tantalum, zirconium and niobium.

Trial and error experiments suggest that when Reaction 14 is driven at sufficiently high current density and/or current concentration and the liquid hold-up is sufficiently low then the relatively slow kinetics of Reaction 8 allow some $CO_2$ to disengage from the anode without reverting to carbonate/bicarbonate. The fraction of $CO_2$ disengaged being dependent in part on the hydroxide concentration driving Reaction 8 and hence on the total cation concentration [M+] and [OH—]/[$CO_3$==] ratio, along with the corresponding carbonate conversion, as indicated in Equations 2 and 3. With suitable specification of components and operating conditions, the performance of the single-electrolyte chamber reactor 10 can be approximately matched with typical carbonate conversion and hydroxide regeneration regimes of DAC.

In some embodiments, the electrochemical reactor 10 is operated continuously at temperatures above 30° C. with a superficial current density in the range of 1 to 10 kA/m2 and in certain cases above about 2 kA/$m^2$ and/or a current concentration in the range of 100 to 10,000 kA/m3 and in certain cases above about 500 kA/$m^3$. Somewhat surprisingly, the hydroxide current efficiency of the electrochemical reactor 10 seems to increase with increasing current density and temperature, with operation at superficial current densities (e.g. about 2 to 10 kA/$m^2$), well above those of the related prior art.

The operation of the electrochemical reactor 10 includes the co-production of hydrogen. The hydrogen to carbon dioxide ratio is estimated by Equation 7 and may be varied to suit downstream processes such as the conversion of $CO_2$ to methanol (e.g. $H_2/CO_2$=3/1) or transportation fuels, as shown in FIG. 1:

| | | |
|---|---|---|
| $H_2/CO_2 = 1/CE$ | mol/mol | Equation 7 |

Figure 3:
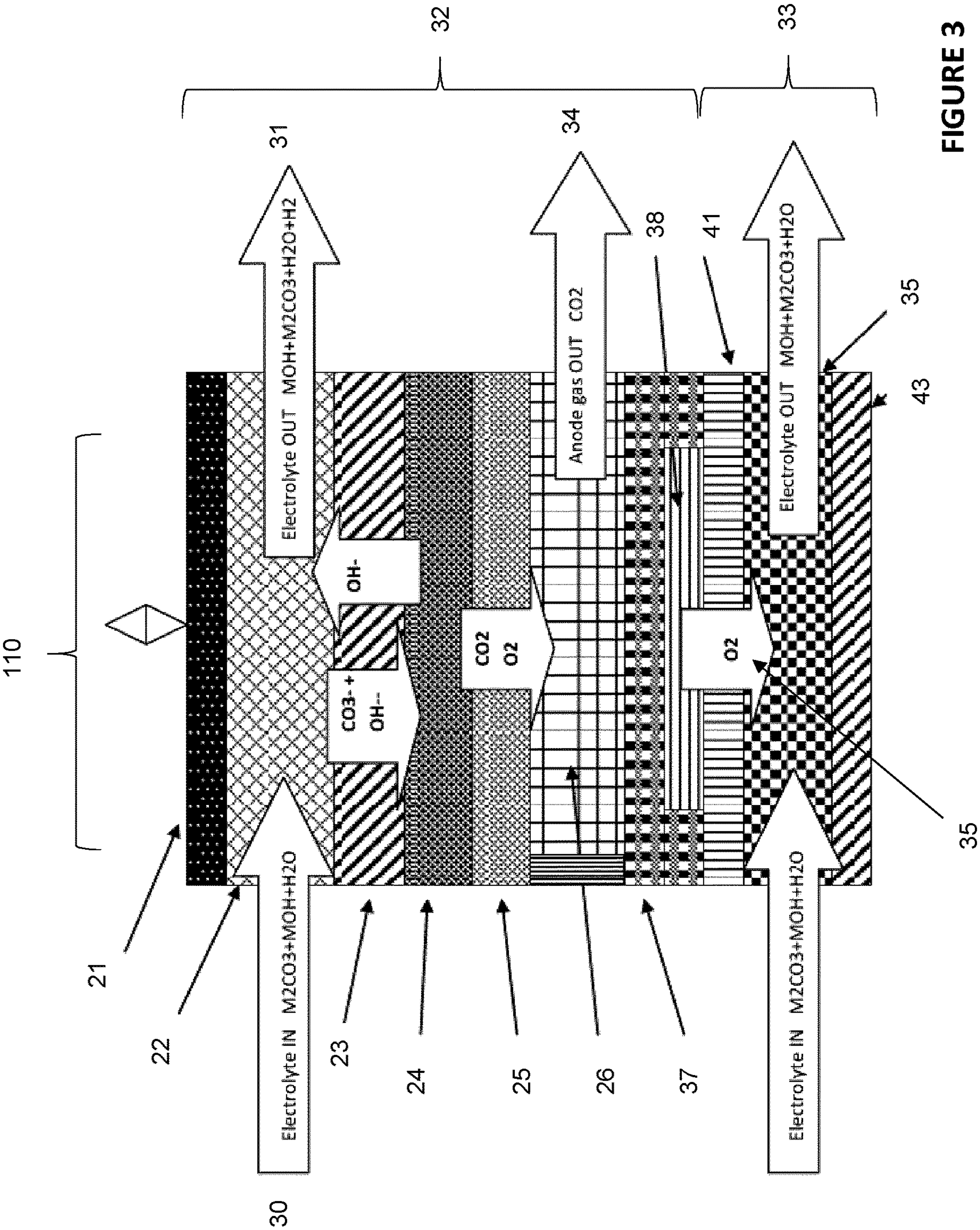
FIG. 3 is a schematic illustration of a multiple cell electrochemical reactor for recovering MOH and $CO_2$ from $M_2CO_3$ according to a second embodiment, wherein the reactor delivers a mixture of [$MOH+M_2CO_3+H_2O$] solution and $H_2$ gas, along with a $CO_2$ product stream and an $O_2$ product stream.

Referring to FIG. 3 and according to a second embodiment, an electrochemical reactor 110 differs from the single cell electrochemical reactor 10 shown in FIG. 2 by comprising multiple cells (only one full cell 32 and part of a second cell 33 are shown in FIG. 3), and including means for separating $CO_2$ from $O_2$ in the product stream of one cell 32 to produce a separate $CO_2$ product stream 34 and a separate $O_2$ product stream 35 which can be used to replace the electroreduction of water in the adjacent cell 33, i.e. to depolarize a cathode 36 in the adjacent cell, thereby lowering the voltage needed to operate the reactor but stopping the production of hydrogen from the cathode 36.

In place of the anode feeder 27 in the first embodiment of the electrochemical reactor 10, the second embodiment of the electrochemical reactor 110 has a porous electron conductive connection plate 37 with an oxygen separation membrane 38 seated centrally within the electronically conductive connection plate 37. The $O_2$ separation membrane 38 could be selective for $O_2$ or for $CO_2$, either of which could accomplish the desired separation. The porous electronically conductive plate 37 can be perforated with small holes (e.g. <2 mm) or comprise felted or sintered fibres or particles with a porosity of about 30 to 90%, 0.1 to 2 mm thick. The oxygen separation membrane 38 separates $O_2$ from anode gas 34 of cell 32 and transfers it to cathode 36 of cell 33. The oxygen separation membrane can comprise a polymeric permeable material such as those currently under development for various gas separation applications, analogous to those disclosed by Han Y. et al., *Polymeric membranes for $CO_2$ separation and capture*, J. Membrane Sci. 2021. The adjacent cell 33 comprises a porous cathode feeder 41 which allows $O_2$ to pass from the product gas exit channel 26, through the oxygen separation membrane 38 and into the cathode 36 of the adjacent cell 33. The adjacent cell 33 also comprises a porous hydrophilic transport barrier 43 and the adjacent cathode 36 may be a gas diffusion electrode, trickle-bed or other 3D electrode suitable for reaction of gases with low solubility in water.

Referring now to FIG. 4 and according to a third embodiment, an electrochemical reactor 210 differs from the electrochemical reactor 10 shown in FIG. 2 by including means for separating $H_2$ gas from the cathode product stream 31, thereby producing a $H_2$ product stream 212 and a MOH, $M_2CO_3$, $H_2O$ stream 31.

The electrochemical reactor 210 comprises a cathode feeder 221, a cathode gas ($H_2$) exit channel 222, a porous hydrophobic $H_2$ separation barrier 223, a cathode 224, a first porous hydrophilic transport barrier 225, an electrolyte flow channel 226, a second porous hydrophilic transport barrier 227, a porous hydrophilic anode 228, a porous hydrophobic [$CO_2$+$O_2$] gas separation barrier 229, a product gas exit channel 230, and an anode feeder 231. The electrolyte flow channel 226 has an inlet at one end to receive an electrolyte feed stream 30 comprising MOH, $M_2CO_3$ and $H_2O$, and an outlet at another end to discharge an cathode product liquid stream 31 comprising MOH, $M_2CO_3$, and $H_2O$. The product gas exit channel 230 has an outlet to discharge a product stream 32 comprising mixed $CO_2$ and $O_2$. Gaskets (not shown) are provided in between components to direct fluid flows and prevent leakage.

The electrochemical reactor 210 operates similarly to the first embodiment 10 to perform electrochemical and thermochemical reactions to produce a mixed $CO_2$ and $O_2$ product stream 32. Unlike the first embodiment, $H_2$ is separated from the cathode product stream 31 by arranging the cathode 224 like the anode 24 of the first embodiment, i.e. by providing the first porous hydrophilic transport barrier 225, porous hydrophilic cathode 224 and porous hydrophobic gas ($H_2$) separation barrier 223.

Alternatively (not shown), the cathode 224 and hydrophilic barrier 223 can be removed and the electrolyte flow channel 226 operated as a 3D cathode in electronic contact with the cathode feeder 221 to generate hydrogen gas which separates from the electrolyte and passes through the first porous hydrophobic barrier 223 into the cathode gas exit channel 222.

The electrochemical reactor 210 can be configured in a multi-cell bipolar mode to:

i. produce product streams comprising a mixture of $CO_2$ and $O_2$ from the anodes,
ii. disengage hydrogen from the cathode/catholyte to produce a $H_2$ product stream by arranging the cathode like the anode, with a porous hydrophilic transport barrier, porous hydrophilic cathode and porous hydrophobic gas ($H_2$) separation barrier;
iii. depolarise the anodes with separated $H_2$ from adjacent cells; or
iv. depolarize the cathode using separated $O_2$ or $CO_2$ from adjacent cells using the means for separating $CO_2$ from $O_2$ in the product stream as disclosed in the second embodiment.

Figure 5:
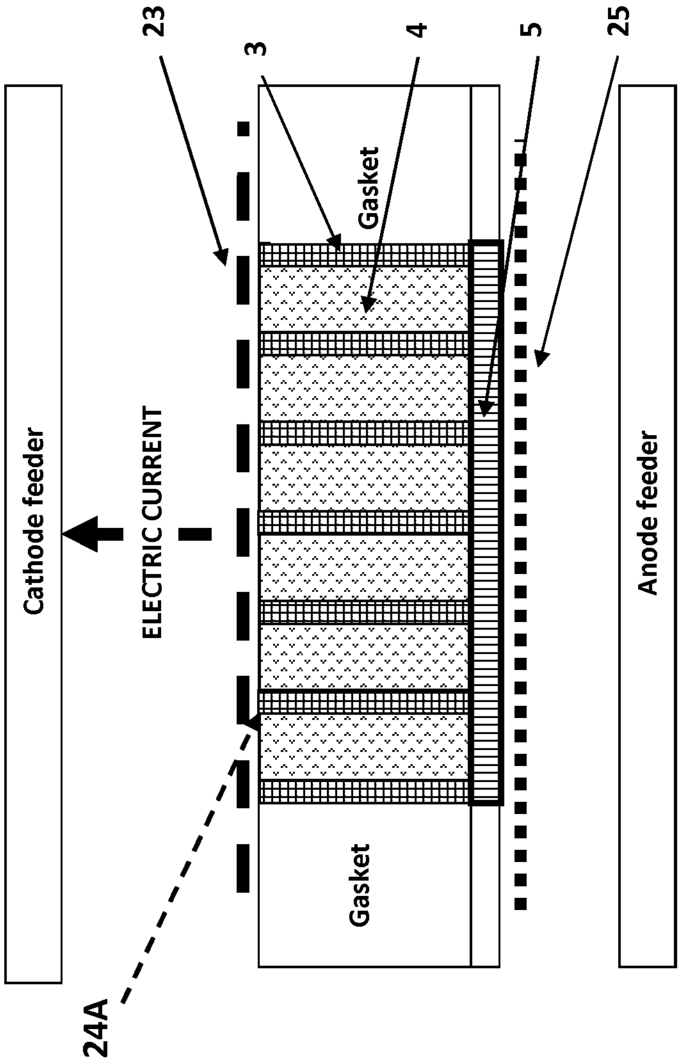
FIG. 5 is a schematic illustration of an embodiment of the anode used in one or more embodiments of the electrochemical reactor.

Referring to FIG. 5 and according to an alternative embodiment, a biphilic anode 24A for use in the electrochemical reactors 10, 110, 210 shown in FIGS. 2-4 is configured to limit contact between the electrolyte and $CO_2$ gas by using hydrophilic and hydrophobic parts arranged for generation of $CO_2$ in the electro-active hydrophilic parts and its disengagement via the hydrophobic parts, then out through the porous hydrophobic [$CO_2$ and $O_2$] gas separation barrier 25. In this case the biphilic anode 24A is held between the porous hydrophilic transport barrier 23 and the porous hydrophobic [$CO_2$ and $O_2$] gas separation barrier 25, and consists of a series of porous hydrophilic electrode pieces 4 separated from each other by porous hydrophobic gas disengagement channels 3 and stacked parallel to the direction of electric current in the reactor. This anode configuration may optionally include an oxidation suppression barrier 5 comprising a porous electronically conductive but electrochemically inactive material between the active biphilic anode 24A and the porous hydrophobic gas separation barrier 25. The purpose of the electrochemically inactive material 5 is to suppress electro-oxidative degradation of the porous hydrophobic gas separation barrier 25 which can occur under some operating conditions, with subsequent loss of its hydrophobicity, and can be used in any of the $1^{st}$, $2^{nd}$ and $3^{rd}$ embodiments. If the biphilic anode 24A is depolarized by hydrogen the anode potential can be relatively low so the protection of the electrochemically inactive material of the oxidation suppression barrier 5 may not be needed, but in DAC applications it may be desirable. The electro-active anode material of the biphilic anode 24A may be the same as the anode 24 shown in FIG. 2 and the hydrophobic channels can be a porous electronically insulating polymer such as PTFE or PVDF. Alternatively the hydrophobic channels could be a porous, hydrophobic, electronically conductive material to aid current distribution in the biphilic anode 24A. Dimensions of each piece can be: height parallel to current about 1 to 10 mm, width orthogonal to current about 0.1 to 5 mm, length to fit reactor. The construction and operation of such an electrode is presented in Example 11.

Embodiments of the electrochemical reactor 10, 110, 210 can comprise multiple adjacent cells to form a multi-cell bipolar or monopolar reactor "stack" (not shown). Such an electrochemical reactor stack could operate at superficial current density above 2 kA/$m^2$ to convert a solution of about [0.4 M MOH+1 M $M_2CO_3$] to a DAC absorbent mixture of about [1 M MOH+0.7 M $M_2CO_3$]. For example, a 20 cell bipolar reactor stack with 0.5 $m^2$ electrodes, along with an external (cf. FIG. 1) or internal oxygen separator (cf. FIG. 3), could potentially treat about 1 tonne/hour of absorbent to generate $CO_2$ at rates up to about 1 ton per day accompanied by hydrogen with $H_2/CO_2$ molar ratio about 2/1 to 6/1.

Figure 6:
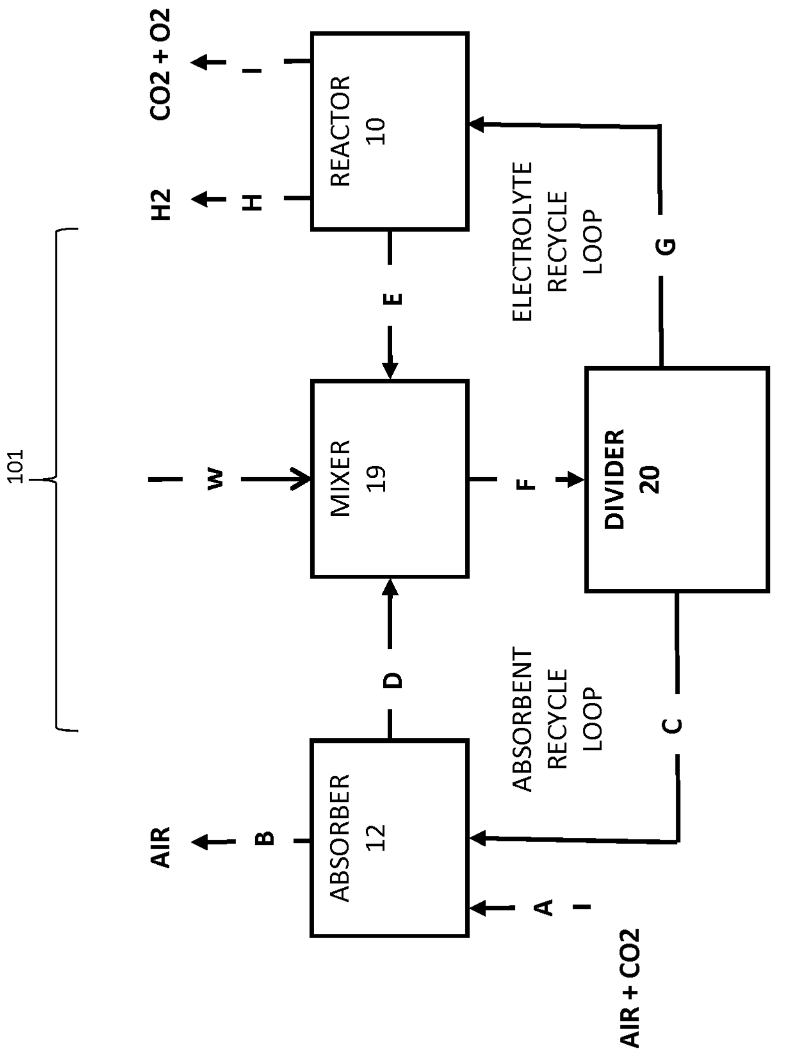
FIG. 6 is a schematic DAC system diagram including an electrochemical reactor for recovering MOH and $CO_2$ from $M_2CO_3$ according to other embodiments of the invention.
Figure 7:
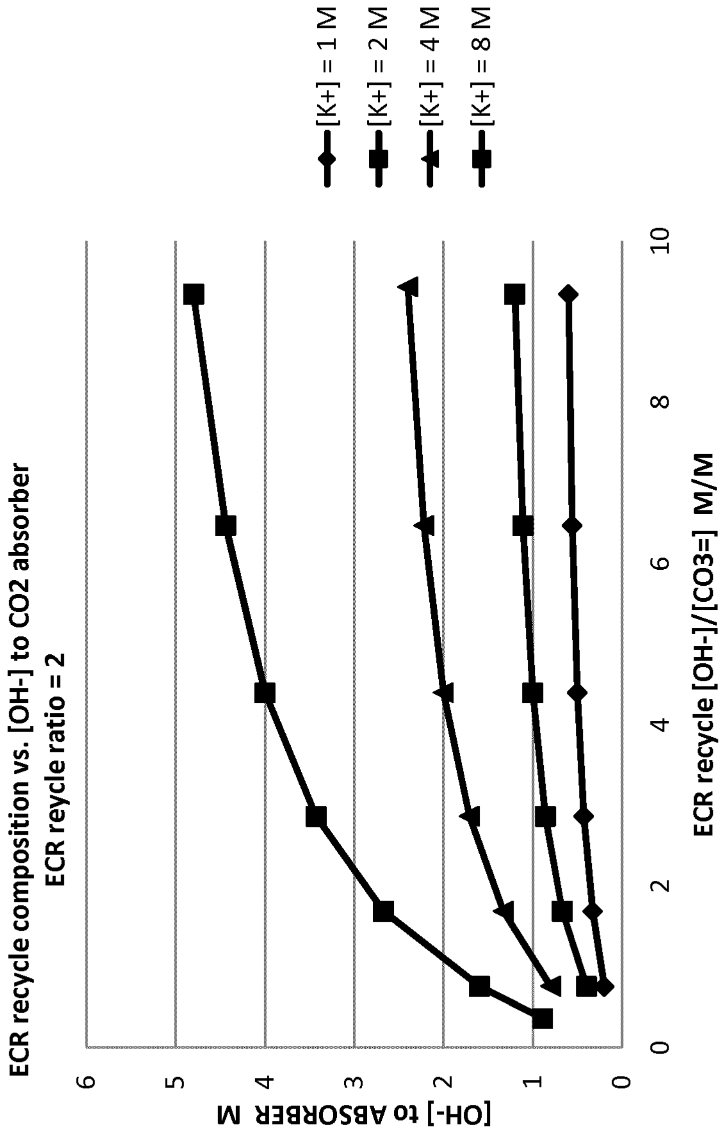
FIG. 7 is a chart of data from a material balance model of the DAC system of FIG. 6.
Figure 19:
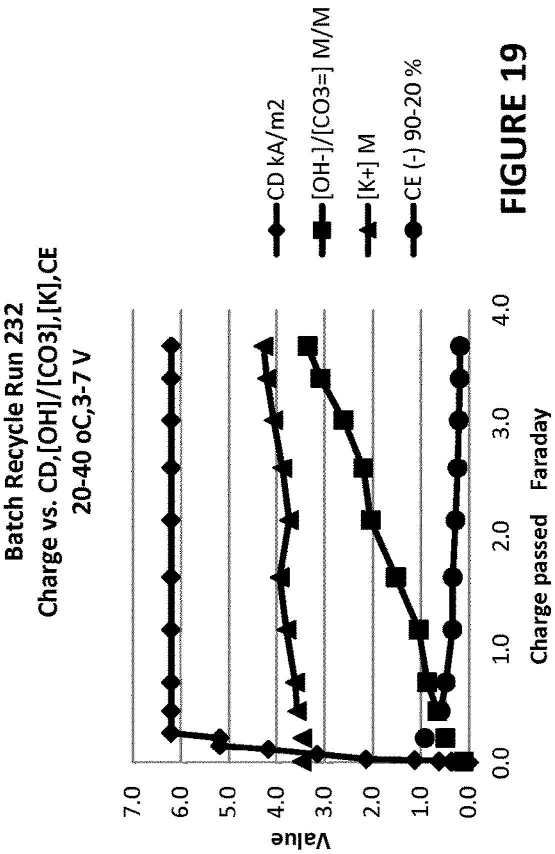
Figure 20:
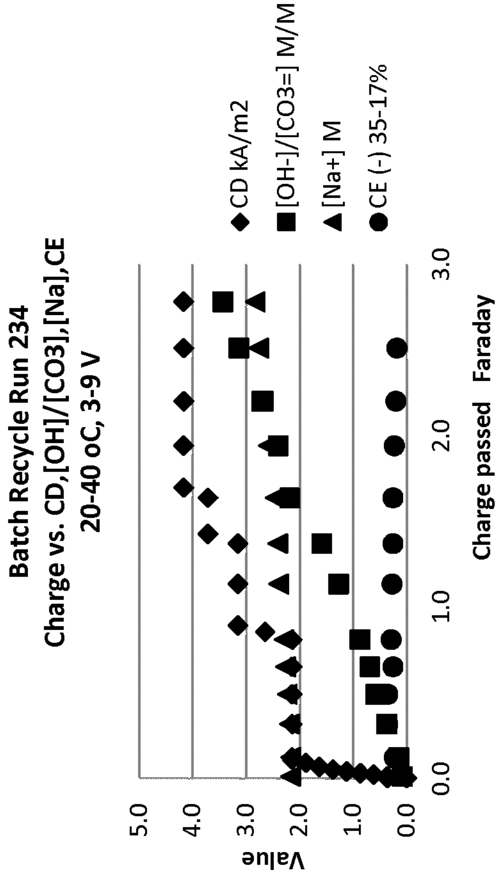

Referring now to FIGS. 6 and 7, another embodiment of a DAC system 101 comprises a $CO_2$ absorber 12 which is coupled in parallel to an electrochemical reactor 10. In this embodiment, air enters the absorber 12 in stream A wherein $CO_2$ is removed and the air leaves in stream B, while the hydroxide/carbonate absorbent is recycled to the absorber 12 via streams C and D through a mixer 19 and then through a flow divider 20 via mixed stream F. The mixer 19 recycles an electrolyte with make-up water W to the electrochemical reactor 10 via streams G and E. More particularly, the mixer combines carbonate ($CO_3$=) loaded absorbent in stream D with electrolyte product in stream E to produce the mixed stream F; the flow divider then divides the mixed stream F into the electrolyte feed stream G and regenerated absorbent stream C. Both absorbent and electrolyte leaving the divider 20 have the composition of the regenerated absorbent, while the electrolyte flow rate and the [OH—]/[$CO_3$=] ratio in stream E are controlled through the electrochemical reactor 10 to maintain near steady state in the DAC process where the [OH—]/[$CO_3$=] ratio in stream C can range from about 0.5 to 2.5 M/M. Exemplary material balance calculations for an operation of the DAC system shown in FIG. 6 give the data of FIG. 7 which plots the [OH—]/[$CO_3$=] ratio in stream E versus the concentration of hydroxide [OH—] into stream C for total cation concentrations [K+] up to 8 M and the ECR recycle ratio of flows in stream E and C=2. For example batch recycle Run 232 in FIG. 19 operating with [K+]=4 M and ECR recycle [OH—]/[$CO_3$=]=3 M/M gives [OH—] into the absorber about 1.8 M.

Figure 8:
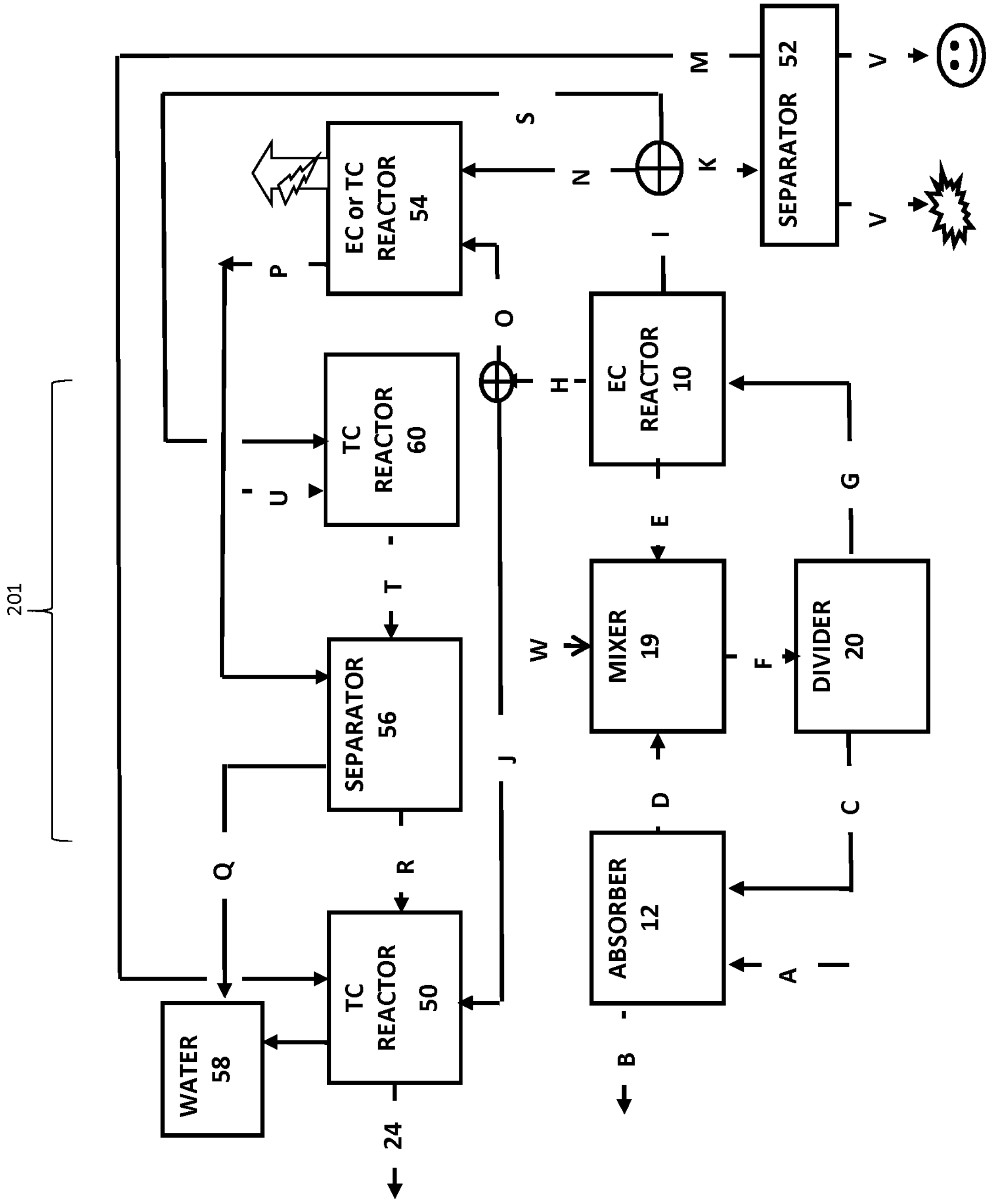
FIG. 8 is a schematic DAC system diagram including an electrochemical reactor for recovering MOH and $CO_2$ from $M_2CO_3$ according to other embodiments of the invention.

Referring to FIG. 8 and according to another embodiment of a DAC system 201, a method of operating the DAC system 201 includes disposition of hydrogen, oxygen and carbon dioxide generated by the electrochemical reactor 10, as well as recovery of water. The DAC system 201 comprises the absorber 12 which operates in parallel with the electrochemical (EC) reactor 10 as described in FIG. 6. The EC reactor 10 produces hydrogen gas (stream H) and a mixture of $CO_2$ and $O_2$ gases (stream I). There are then several options for the disposition of these gases. In one option, hydrogen in stream H is fed via stream J to a thermochemical (TC) (or electrochemical) reactor 50 while [$CO_2$+$O_2$] gases pass to a $CO_2/O_2$ separator 52 via stream K. The $CO_2/O_2$ separation may be done "ex-situ" by methods known to the art, or "in-situ" by a $CO_2$ or $O_2$ selective membrane directly from the anode gas channel 6 of the EC reactor 10 (see FIG. 2). Carbon dioxide from separator 52 may be disposed "as-is" in stream K or preferably via stream M to the thermochemical (or electrochemical) reactor 50 where depending on the $H_2/CO_2$ mol ratio it may be used with the hydrogen to synthesis methanol or other useful products. In a second option, $H_2$ from stream H and [$CO_2$+$O_2$] gases from stream I pass via streams O and N with a molar $H_2/O_2$ ratio of 2 to an oxidation reactor 54, which removes the $H_2$ and $O_2$ by Reaction 16:

$$2H_2+O_2\rightarrow 2\ H_2O \qquad \text{Reaction 16}$$

The concentrated $CO_2$ then passes by stream P to water separator 56 where water is recovered via stream Q into water storage unit 58, and $CO_2$ passes to the thermochemical (or electrochemical) reactor 50 in stream R.

In a third option the [$CO_2$+$O_2$] of stream I passes via stream S to a thermochemical (TC) reactor (burner) 60 where the $O_2$ is removed by combustion with a hydrocarbon fuel U and the $CO_2$ formed passes in stream T to the water separator 56 and on via stream R to adjust the $H_2/CO_2$ ratio for the desired reaction(s) in the reactor 50.

Oxygen separated by the $CO_2/O_2$ separator 52 (stream V) may be used in many ways, including for example in oxy-fuel combustion and as medical oxygen. Preferably the separated oxygen may be released to the atmosphere to compensate for oxygen consumed in the combustion of fossil fuels as in exemplary Reaction 17. Here it should be noted that such combustion requires consumption of at least one kmol of oxygen (32 kg) per kmol of $CO_2$ (44 kg) produced. The capture and sequestration of $CO_2$ implies a corresponding net deficit of atmospheric oxygen that may not be replaced by the usual natural mechanisms in Earth's failing ecosystem.

$$CH_4+2O_2+CO_2+2H_2O \qquad \text{Reaction 17}$$

As well as enabling removal of $CO_2$ from the air, the electrochemical regeneration of absorbent could have a vital role in replacing the atmospheric oxygen consumed in the formation of that $CO_2$.

Of note, in all cases the [$CO_2$+$O_2$], $H_2$, $O_2$, $CO_2$ and air product gases contain $H_2O$ gas due to evaporation of water from the absorbent and electrolyte. The continuous operation of all systems outlined in FIGS. 1,6 and 8 requires an input of water ($H_2O$) to close the process water balance.

Although the electrochemical reactors shown in FIGS. 2, 3, 4 and 5 show a flat plate architecture arranged in a horizontal position, the electrochemical reactors may have other configurations and dispositions, such a tubular reactor in the vertical position, in other embodiments.

Figure 18:
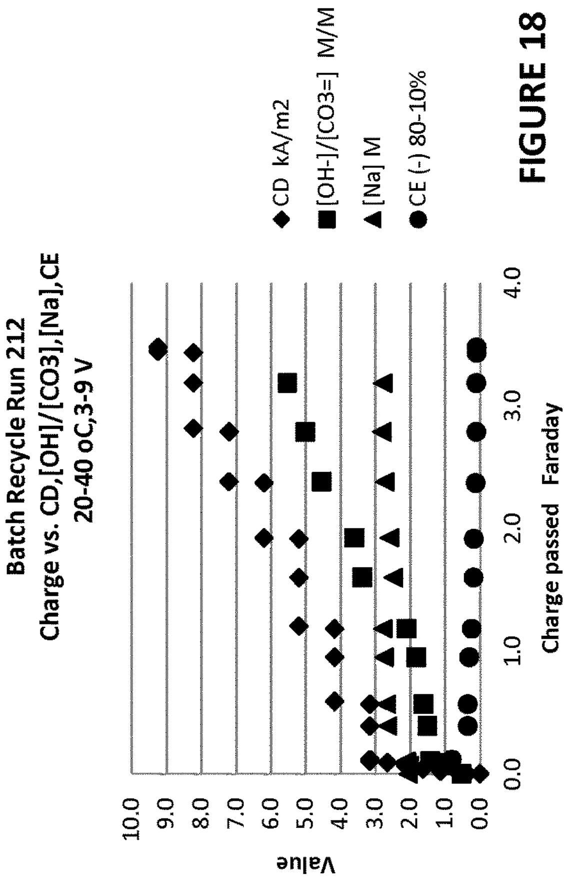
Figure 21:
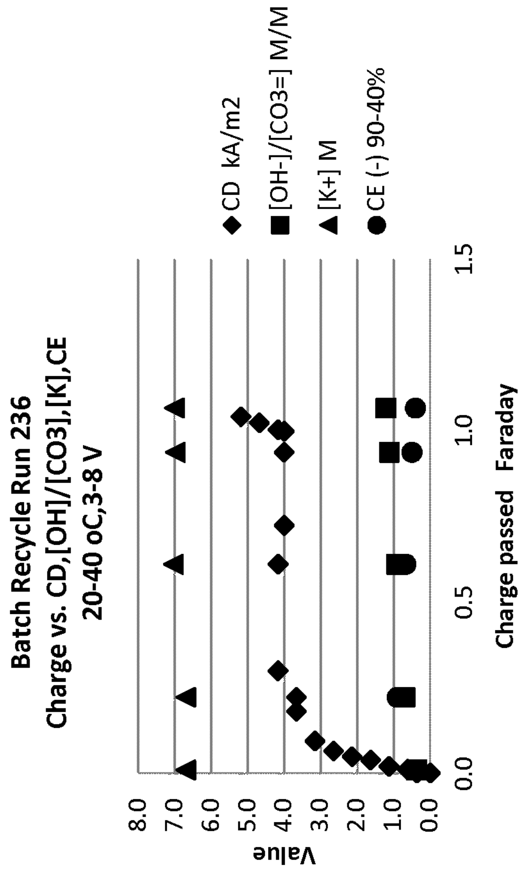

More broadly, the use of electrochemical reactors 10, 110, 210 for regeneration may open the DAC design space to include a wider range of absorbent compositions than accessible with thermochemical causticizing. The electrochemical process is not constrained by factors affecting Reaction 2 and can obtain [OH—]]/[$CO_3$═] ratios up to at least 5, corresponding to about 70% conversion of carbonate to hydroxide, as evidenced by experimental data that are discussed in more detail under Examples. For instance, FIG. 18 shows the result of batch recycle Run 212 with sodium carbonate at superficial current densities up to 9 kA/$m^2$, where [OH—]/[$CO_3$═] reaches about 5.5 M/M with [Na+] near 2.8 M and [OH—] about 2 M. Also, the efficiency of the electrochemical system increases with carbonate concentration up to at least 3.5 M. FIG. 21 shows the result of batch recycle Run 236 with potassium carbonate in which the [OH—]/[$CO_3$═] ratio reached about 1.0 with [K+] near 7 M and [OH—] about 2.6 M. Electrochemical regeneration of absorbent also has the potential benefit of operating the absorber with hydroxide concentrations perhaps up to about 4 molar, with a subsequent decrease in absorbent flow rate and attendant positive effects in absorber design.

These (and other) experimental data invoke reflection on operating the $CO_2$ absorber with process conditions outside the range considered viable for the thermochemical DAC process. That possibility is reinforced by evidence that the rate of absorption of $CO_2$ depends largely on the rate of Reaction 8, which increases with both hydroxide concentration and ionic strength of the absorbent [see Pohoreck, Stolaroff]. Calculations based on Pohoreck with the data of FIGS. 18 and 21 give ionic strengths respectively 1 and 3 M with reaction rate constants about 1E4 and 4E4 $m^3$/kmol·s at 20° C. compared to about 1.6E4 $m^3$/kmol·s for the DAC absorbent reported in Keith. Although the rates of absorption of $CO_2$ into the concentrated electrolyte solutions may be depressed by the fluid dynamic effects of density, viscosity and surface tension it is supposed that the use of absorbents with such high ionic strength could reduce the size and cost of the absorber.

Optimum design of an integrated thermochemical-electrochemical DAC plant would start from selection of its location and scale—both of which would depend on the availabilities and prices of water and fossil-free electricity as well as the method of $CO_2$ disposal or utilization. From this basis the scale of the plant could range from about 1E-3 to 1E3 tonne $CO_2$ per day in either intermittent or continuous operation. The optimization objectives could for example include minimizing the capital cost, operating cost, some combination of capital and operating costs, energy consumption or another desirable outcome such as the carbon footprint of the process. With such objective(s), the design could consider the interacting effects of at least the following factors:

- $CO_2$ absorption efficiency
- series or parallel operation of the absorber and the electrochemical reactor
- alkali metal cation
- total cation concentration
- hydroxide/carbonate ratios in and out of the absorber Operation of a $CO_2$ direct air capture process comprising a $CO_2$ absorber integrated in a recycle loop with an electrochemical reactor, wherein an aqueous alkali metal hydroxide/carbonate solution functions as both carbon dioxide absorbent and reactor electrolyte, could be optimized by:

- aiming for a $CO_2$ absorption efficiency in the range about 40 to 80%
- selecting the alkali metal cation in the absorbent-electrolyte from among sodium, potassium, rubidium and caesium or a mixture thereof;
- choosing to operate the absorber in series or in parallel with the electrochemical reactor;
- setting the total alkali metal cation concentration in the absorbent-electrolyte in the range about 0.1 to 10 molar; and
- fixing the [OH—]/[$CO_3$═] ratio in the absorbent-electrolyte into and out of the absorber respectively in the ranges about 0.5 to 5 and 0.1 to 2.

Optimization of a parallel operation of absorber and electrochemical reactor could comprise: setting the ratio of absorbent-electrolyte flows to the reactor and absorber in the range about 2 to 6.

The selection of values in these ranges may be executed in any sequence, suited to optimize operation of the multivariable non-linear interactive system.

EXAMPLES

Figure 9:
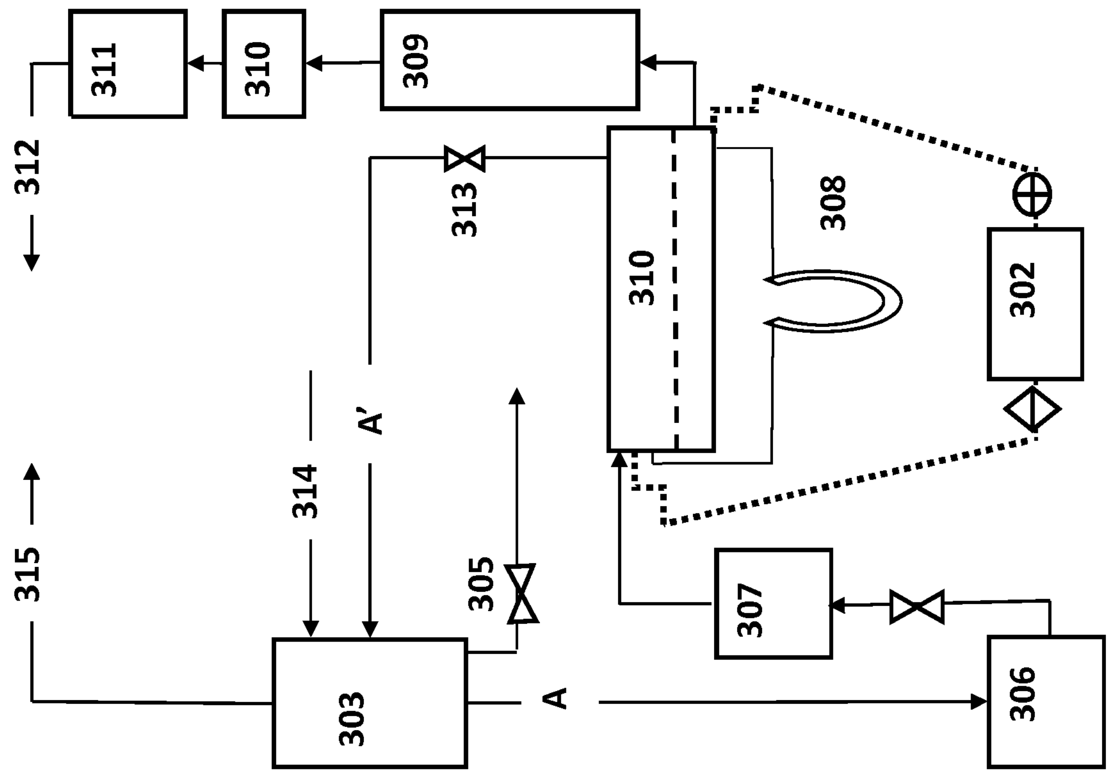
FIG. 9 is a schematic diagram of an experimental embodiment of the DAC system.

Referring to FIG. 9, an experimental electrochemical reactor was constructed with the following specifications to produce data as shown in FIGS. 10-22.

The equipment shown in FIG. 9 is set up for a batch recycle process with a DC power supply 302 driving an electrochemical reactor 310 through which a single electrolyte solution A, A' recycles via electrolyte feed tank 303, sampling valve 305, pump 306, liquid rotameter 307 and cathode out throttle 313. The pressure difference between electrolyte inlet and anode gas outlet is measured by manometer 308 and gas from the anode passes through an anode gas water column 309, silica gel drier 310 and gas rotameter 311 and into the atmosphere 312 as [$O_2$+$CO_2$] product gas stream. The headspace of the feed/recycle tank 303 is purged with copious air 314 to dilute cathode product hydrogen below its danger limit of 4 vol % for discharge into a fume hood 315 as [Air+$H_2$] product gas stream Table 2 lists specifications of materials used in the experimental reactor, except for the endplates, bolts and gaskets.

External dimensions of the experimental reactor, including endplates: about 22 cm×6 cm×4 cm Superficial electrode dimensions of both anode and cathode: about 10 cm by 2 cm Superficial anode and cathode area: about 20 $cm^2$=2E-3 $m^2$ (each)

C., 1 bar(abs)) without control of the reactor temperature. In some cases Joule heating took the reactor outlet temperature up to about 70° C. but in most runs the temperature ranged from about 20 to 40° C.

Example 1

An experiment was conducted using an experimental reactor configured according to the embodiment shown in FIG. 2. Component specifications as given in Table 2, with the components shown in FIG. 2 having the following properties:

Cathode feeder 21: a stainless steel plate. 220 mm long by 60 mm wide by 1.6 mm inch thick, Cathode 22: 3 layers of expanded nickel mesh with a thickness 3 mm, mesh opening 3 mm, plus 1 layer of plastic mesh with 2 mm openings for mechanical protection of the hydrophilic transport barrier 23, which was 100 mm long by 20 mm wide by 3 mm thick.

Hydrophilic transport barrier 23: 1 layer SciMAT microporous hydrophilic polypropylene+1 layer glass

TABLE 2

Non-exhaustive List of Example Reactor Materials

| | | | Specification (approximate) | | | | | | | |
|---|---|---|---|---|---|---|---|---|---|---|
| Component | Item | Material | Thick[1] mm | Porosity[1] % | Pore diam[1] um | Perm coeff[2] m | Bubble point[3] kPa | Cap press[3] kPa | Catalyst — | Source |
| Cathode feeder | 21 | SS | 1.6 | 0 | NA | NA | NA | NA | None | NA |
| Cathode | 22 | Ni foam | 4 | >90 | 1000 | 1e−10 | <1 | <1 | None | E |
| | | Ni foam | 1.6 | >90 | 150 | 1e−10 | <1 | <1 | None | E |
| | | Ni mesh | 2 | >60 mesh | 3000 | 1E−9 | <1 | <1 | None | F |
| | | PPmesh | 1, 0.4 | >60 mesh | 2000 | 1E−9 | <1 | <1 | None | H |
| Hydrophilic barrier | 23 | PPi | 0.1 | NV | <10 | 2E−13 | 6 | 6 | None | SciMAT ™ |
| | | PPi | 0.2 | NV | <10 | 4E−13 | 3 | 3 | None | Viledon ™ |
| | | PES | 0.1 | NV | 0.8 | 2E−14 | 100 | 100 | None | C |
| | | Glass | 0.6 | NV | 3 | 1E−12 | 5 | 5 | None | C |
| | | Zircar ™ | 0.6 | 80 | 5 | 1E−12 | 3 | 3 | None | B |
| Anode | 24 | Ti sinter | 2.2 | 30 | 100 | 1E−12 | 0.5 | 0.5 | Ir/Ru(8) | D |
| | | Ti sinter | 1.0 | 30 | 10 | 1E−14 | 2 | 2 | Ir/Ru(8) | D |
| | | Ti mesh | 1.0 | 60 | 1000 | 1E−10 | <0.5 | <0.5 | Ir/Ru(8) | D |
| | | Ti fibre | 3 | 95 | 100 | 1E−10 | <1 | <1 | Pt | TySAR ™ |
| | | Ti felt | 0.2 | >60 | 50 | 1E−10 | <1 | <1 | None | A |
| | | PTFE | 0.5 | >60 mesh | 1000 | 1E−10 | NA | −1 | None | I |
| Hydrophobic barrier | 25 | Ni/PTFE | 0.6-2 | 90 | 200 | NA | NA | −2 | None | J |
| | | C/PTFE | 0.4 | 78 | <100 | NA | NA | −5 | None | A Spec ™ |
| | | C/PTFE | 0.4 | 78 | <100 | NA | NA | −9 | None | A Tor ™ |
| Anode product gas channel | 26 | Ti fibre | 3 | 96 | 100 | NA | NA | NA | None | TySAR ™ |
| | | Ni foam | 3 | 95 | 500 | NA | NA | NA | None | E |
| | | Ni mesh | 0.3 | 60 | 1000 | NA | NA | NA | None | F |
| | | Ni mesh | 2 | 60 | 3000 | NA | NA | NA | None | F |
| Anode feeder | 27 | SS | 1.6 | 0 | NA | NA | NA | NA | None | NA |
| Gaskets* | Gasket thickness varied from 0.2-1.8 mm, alone or stacked, for sufficient compression of components. | | | | | | | | | |

*Gasket thickness and compressibility are important because they affect internal electronic resistance, component porosity and fluid distribution in the reactor.

SS = 316 stainless steel, Ti = titanium, Ni = nickel, C = carbon

PP = hydrophobic polypropylene, PPi = hydrophilic prolypropylene, PTFE = polytetrafluorethene

[1]= uncompressed, [2]= vs. liquid water at 20° C. [3]= liquid water vs. air at 20° C. (positive = hydrophilic, negative = hydrophobic)

Ir/Ru = iridium/ruthenium oxides (superficial loading um)

PES = polythersulphone, Zircar = woven zirconium oxide ($ZnO_2$)

Spec = Spectracarb 2050A-1550 w. 50 wt % PTFE, Tor = Toray TGP-H-120 w. 50 wt % PTFE Perm. coeff = D'Arcy coefficient of permeability for liquid water at 20° C., Cap. press = capillary pressure, liquid water vs. air at 20° C.

NA = not applicable, NV = not available

Sources: A = Fuel Cell Earth (USA), B = Zircar Zirconium Inc. (USA) C = Qing Feng Filter Co. Ltd. (China) D = Baoji Highstar (China), E = INCO (Dialian) Co. Ltd. (China), F = Dexmet (USA), G = Freudenberg (Germany) H = Home Depot (Canada), I = Shanghai Dizhe Co. Ltd. (China), J = In-house The experimental reactor was used in continuous recycle operation in the horizontal position, anode facing up and electrolyte flow in the lengthwise (longest) direction. Experiments were carried out under ambient conditions (20° fibre mat against the anode face. Total thickness ca. 1 mm, pressed against the anode.

Porous hydrophilic anode 24: an iridium/ruthenium oxide coated porous sintered titanium, porosity 30%, pore size 100 micron, superficial Ir/Ru load 8 micron. Dimensions 100 mm long by 20 mm wide by 2 mm thick. Effective superficial area about 20 $cm^2$.

Porous hydrophobic $CO_2$ separation barrier 25: Spectracarb 2050A 1550 Teflonated carbon paper, 50 wt % PTFE, thickness 0.3 mm, backed by one 0.2 mm thick layer of Teflonated carbon cloth to protect gas separation barrier 25 from damage by compression with gas exit channel 26.

$CO_2$ exit channel 26: 1 layer expanded nickel mesh, mesh opening 3-4 mm. Dimensions 100 mm long by 20 mm wide by 2 mm thick.

Anode feeder 27: stainless steel plate. 220 mm long by 60 mm wide by 1.6 mm thick.

All components were pressed tightly together between % inch Plexiglass endplates, held with eight insulated ¼ inch stainless steel bolts, with provision for electrical connection of the electrode feeders Items 1 and 7 to the DC power supply Sinometer RXN 1520D (not shown).

All components had inlet and/or outlet fittings/ports and are appropriately gasketed to direct the fluid flows and prevent leakage. The endplates, electric connections, fittings/ports, bolts and gaskets are not shown in the Figures.

Conditions

Initial electrolyte: 0.8 mole/litre (M) sodium carbonate ($Na_2CO_3$) in water. Total volume=1 litre Electrolyte flow, lengthwise=20 ml/minute (recycling).

Current=1.8 to 5.4 Ampere DC. Operating time=22 hours.

Superficial current density (CD)=0.9 to 2.7 kA/$m^2$

Temperature 20 to 50° C.

Pressure in electrolyte channel=approx 120 kPa(abs)

Pressure in anode gas out channel=approx 110 kPa(abs)

Anode gas flow ($CO_2$(g)+$O_2$(g)+$H_2O$(g)) approx 20 to 40 standard millilitre/minute.

Periodic samples of electrolyte were taken throughout the batch recycle run and analysed for hydroxide [OH—] and carbonate [$CO_3$==] concentration by sequential titration with phenolphthalein and methyl orange indicators. The corresponding integral current efficiencies for hydroxide were calculated as:

$$CE=\{([OH—]V)\text{final}-([OH—]V)\text{initial}\}/(C/F) \quad \text{Equation 8}$$

Where:

| | |
|---|---|
| V = electrolyte volume | litre |
| C = charge passed = integral [(current) (operating time)] | Ampere second = Coulomb |
| F = Faraday's number = 96489 | Coulomb/mol |

Figure 10:
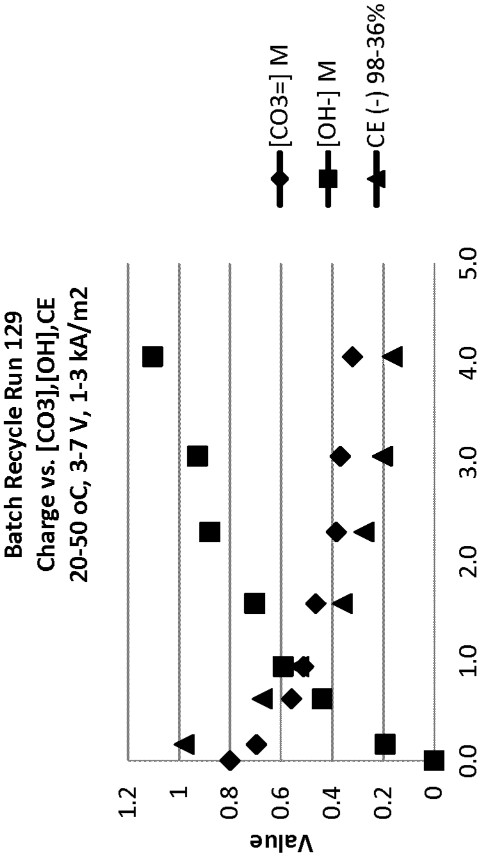
FIGS. 10 to 21 are charts of the performance of experimental, single-cell electrochemical reactors wherein concentrations of carbonate [$CO_3$=], hydroxide [OH—] and sodium [Na+] or potassium [K+] are shown as mole/litre (M), in the electrolyte as a function of total charge passed in Faradays, along with the hydroxide/carbonate ratio [OH—]/[$CO_3$=] M/M, superficial current density in $kA/m^2$ and the dimensionless current efficiency (CE) for hydroxide.

FIG. 10 (Run 129) shows the concentrations of hydroxide [OH—] and carbonate [$CO_3$==] as mole/litre (M), in the electrolyte as a function of total charge passed, along with the integral current efficiency (CE) for hydroxide over an operating period of 18 hours.

NB. The voltages recorded in all Examples are the "full cell" reactor voltages measured between the anode to cathode feeders, which include all components of the overall voltage balance well known in the art, except those in the current delivery lines and contacts with the SS feeder electrodes. Experimental observations indicated an internal loss of about 2 V at 6 kA/$m^2$ due mostly to electronic contact resistance between components.

The chart in FIG. 10 demonstrates the feasibility of the single electrolyte chamber electrochemical reactor for application to DAC. Note that the [OH]^[$CO_3$==] cross-over point near 1.5 Faraday and end-point near 3.2 Faraday correspond approximately to the ranges of [OH—] and [$CO_3$==] used in the DAC process described in Keith and given here in Table 3. Also, a current efficiency of 0.33 (33%) in FIG. 10 would correspond to a product $H_2/CO_2$ mole ratio of 3/1, as might be used for the thermochemical synthesis of methanol.

TABLE 3

| Keith | Spent absorbent | Fresh absorbent |
|---|---|---|
| [OH—] M | 0.68 | 1.1 |
| [$CO_3$==] M | 0.66 | 0.45 |

Example 2

An electrochemical reactor was assembled as in Example 1, except:

Hydrophilic barrier 23: glass fibre mat was replaced by 1 layer of Viledon microporous hydrophilic polypropylene, followed by a second SciMAT and a hydrophilic polymer felt, total barrier thickness 2.4 mm, pressed against the anode.

Porous hydrophilic anode 24: porous Ir/Ru/titanium anode replaced by TySAR platinised titanium fibre, uncompressed porosity 96%, thickness 3 mm.

Gas separation barrier 25: Spectracarb replaced by 1 layer of Teflonated nickel foam, 95 pore per inch, thickness 1.5 mm. Effective contact resistance under compression against stainless steel about 1 V at 2 kA/$m^2$.

Figure 11:
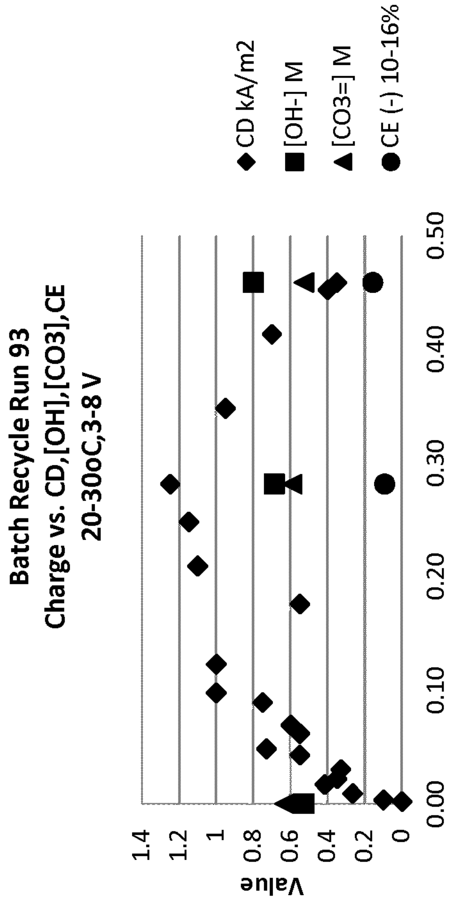

Results are shown in FIG. 11 (Run 93) and indicate the Teflonated nickel foam fabricated in-house can function as a hydrophobic barrier 25 but appears inferior to commercial Spectracarb in that role.

Example 3

An electrochemical reactor was assembled as in Example 1, except:

Hydrophilic barrier 23: SciMAT was replaced by 1 layer of borosilcate glass filter, thickness 0.3 mm, pore diameter 1 um, pressed against the anode.

Product gas exit channel 26: added one layer of TySAR platinised titanium fibre mat between gas separation barrier 25 and product gas exit channel 26 to prevent compression damage to the gas separation barrier 25.

Figure 12:
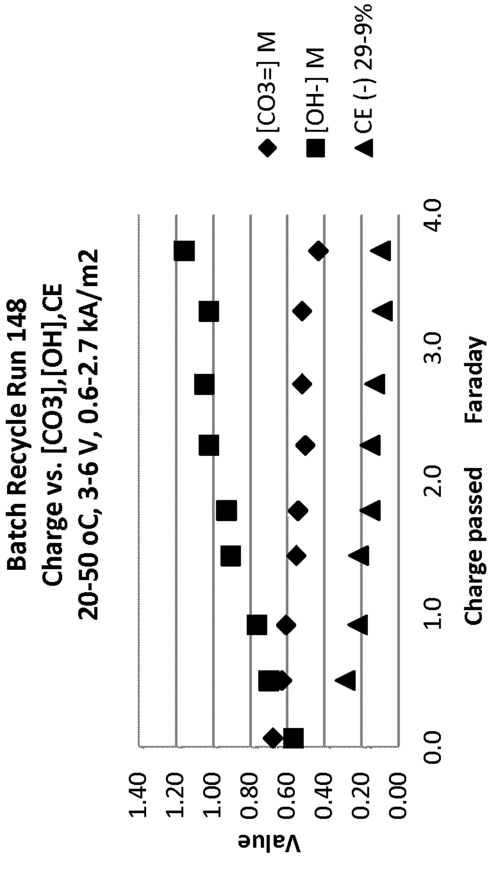
Figure 13:
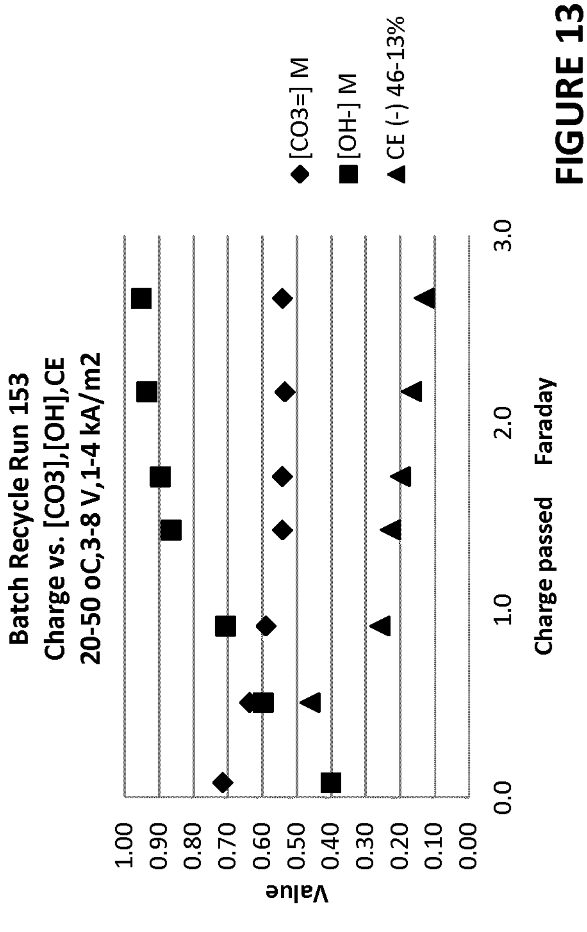

Operating conditions and time were similar to those in Example 1, except the initial electrolyte held a mixture of 0.57 M hydroxide and 0.68 M carbonate, roughly equivalent to the spent DAC absorbent of ref 43 (Keith). The results are shown in FIG. 12 (Run 148) and indicate a final electrolyte composition approximating that of the fresh (regenerated) DAC absorbent of Keith albeit with an integral hydroxide current efficiency of only 9%.

Example 4

An electrochemical reactor was assembled as for Example 3, except:

Hydrophilic barrier 23: SciMAT was replaced by 1 layer of borosilicate glass filter, thickness 0.6 mm, pore diameter 3 um, permeability coefficient about 1E-12 $m^2$.

Operating conditions were similar to those of Example 1, except the maximum superficial current density was increased to 4 kA/$m^2$ and operating time reduced to 13 hours. The result of FIG. 13 (Run 153) shows hydroxide and carbonate concentrations respectively from 0.4 to 0.9 M and 0.7 to 0.5 M, with integral hydroxide current efficiency from 46 to 13%.

Example 5

In the operations of Examples 1, 2, 3, 4 the anode 24 was pressed directly onto the hydrophobic gas separation barrier 25. In those (and other) cases it was observed that with high current density (e.g. above 1 kA/$m^2$) and long operating times (e.g. above 5 hours) the hydrophobic barrier lost effectiveness as it became increasingly hydrophilic and eventually was corroded and sometimes perforated along its edges. Since the anode was not depolarized by hydrogen (as in the prior art) the loss of effectiveness in the hydrophobic gas separation barrier 25 was assumed due to its electro-oxidation by the high anodic potential of contact with the anode 24.

In this Example, the electrochemical reactor was assembled as for Example 4, except:

Hydrophilic barrier 23: The glass filter was replaced by 1 layer of SciMAT and an approximately 0.2 mm thick titanium fibre felt (as in FIG. 5 oxidation suppression barrier 5) was placed between the anode 24 the hydrophobic gas separation barrier 25 to suppress oxidation of the hydrophobic gas separation barrier 25.

Figure 14:
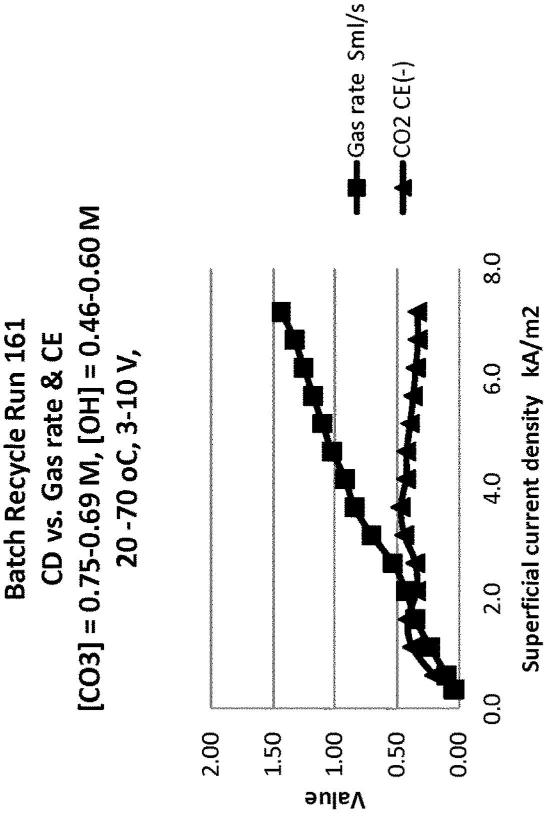

Operating conditions were similar to those of Example 1, except the maximum superficial current density was increased to 7 kA/$m^2$ while the rate of anode gas generation was observed over a period of 1 hour with the result of FIG. 14 (Run 161). Assuming the anode gas is a mixture of oxygen, carbon dioxide and water vapour the instantaneous current efficiency for $CO_2$, (which equals the CE for hydroxide) was calculated from a material balance with the electrochemical stoichiometry and is presented in FIG. 14 (Run 161). FIG. 14 shows the CE for $CO_2$ initially increasing with current density up to 2 kA/$m^2$ then dropping as the CD increased while electrolyte outlet temperature rose from about 20 to 70° C. Disasembly of the reactor after a further 27 hours operation with superficial current density up to 5 kA/$m^2$ showed substantially less degradation of hydrophobic gas separation barrier 25 than in Examples 1, 3 and 4.

Example 6

An electrochemical reactor was assembled as in Example 5, except:

Cathode 22: Polypropylene mesh replaced by nickel foam, 1.6 mm thick, 150 um pores.

Hydrophilic barrier 23: Replaced by one layer of SciMAT plus 1 layer of Viledon hydrophilic polypropylene.

Hydrophobic gas separation barrier 25: Spectracarb 2050-1150 replaced by Toray carbon paper TGP-H-120 with 50% PTFE.

Operating conditions were similar to those of Example 5, except that the recycling electrolyte volume was reduced to about 0.5 litre and recycling electrolyte flow increased to about 100 ml/minute. A manometer (FIG. 9, Item 308) measured the differential pressure between electrolyte inlet and anode gas outlet over an operating time of 6 hours.

The anode/cathode differential pressure was seen to affect performance of the reactor and consequently manipulated to some extent through the electrolyte flow rate, the height of the anode gas water column and a throttle on the electrolyte outlet—shown in the cathode out throttle 313 of the apparatus shown in FIG. 9. For Example 6, the anode/cathode pressure difference ranged from about 1.5 to 2 kPa (15-20 cm water).

Figure 15:
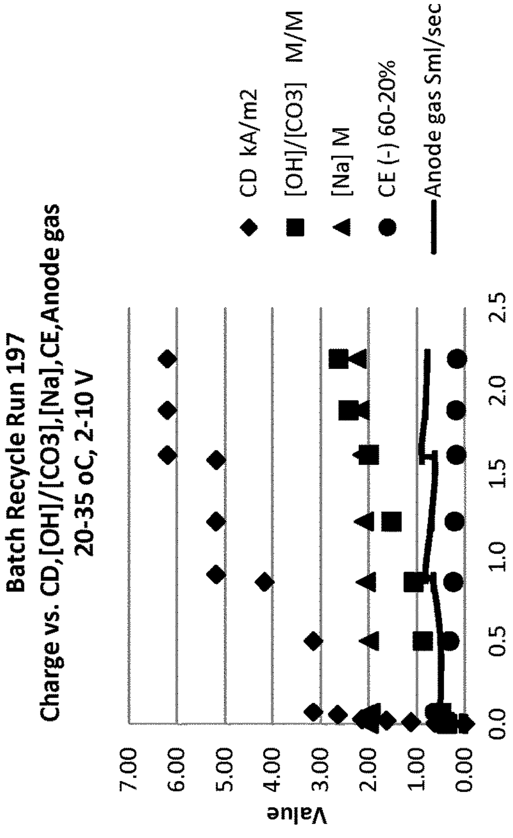
Figure 16:
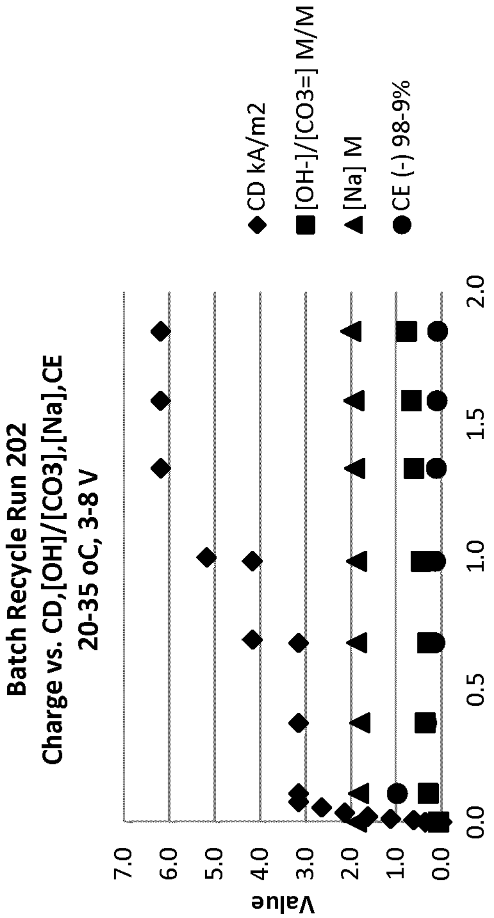

FIG. 15 (Run 197) shows the results where the hydroxide and carbonate concentrations are given in the total cation concentration [Na+] and the [OH—]/[$CO_3$==] molar ratio, from which the individual species concentrations may be calculated by Equations 9 and 10:

$$[OH—]=XY/(2+X) \qquad \text{Equation 9}$$

$$[CO_3{=}{=}]=Y/(2+X) \qquad \text{Equation 10}$$

Where: Y=[Na+] M, X=[OH—]/[$CO_3$==] M/M

The [OH—]/[$CO_3$==] ratio reported in this and subsequent Examples is more useful than the individual ion concentrations because it:

a. Is not dependent on concentration changes due to the loss of water from the electrolyte.
b. Can be used in Equation 2 to find the carbonate conversion.
c. Reflects conditions/constraints in the thermochemical DAC/causticising process.
d. Could be useful in understanding and modelling the electrochemical process.

Starting from initial [OH—] and [$CO_3$==] values of respectively 0.32 and 0.84 M the [OH—]/[$CO_3$==] ratio increased from about 0.4 to 2.6 while [Na+] rose from about 2.0 to 2.3 M due to loss of water by evaporation and reaction. A high evaporative loss of water was due to continual air purge of the electrolyte feed tank. The superficial current density reached about 6 kA/$m^2$ at 10 Volt (full cell) while integral hydroxide CE dropped from about 60 to 20%.

Examination of reactor components showed about 30% loss of hydrophobic area on gas separation barrier 25 together with black deposits on the transport barrier 23 and some loss of catalyst from the anode 24. These observations indicate a degree of corrosion of reactor components that may not be tolerable in a practical process. In subsequent experiments peripheries of the Ti felt between the anode 24 and transport barrier 23 were insulated to suppress high edge potentials suspected of corroding (i.e. oxidising) gas separation barrier 25. Note that this type of corrosion probably would not occur in prior art where the anode potential was kept low by depolarizing it with hydrogen.

Results of Examples 1 to 6 indicate that the reactor performance is affected by the thickness and permeability of the transport barrier 23 which would influence the rates of reactant transport to/from the anode as well as the reactor internal electric resistance.

Example 7

An electrochemical reactor was assembled as in Example 6, except:

Anode 24: The porous Ir/Ru/Ti anode 25 was replaced by a platinised Ti fibre matrix (TySAR) with fibre diameter around 20 um and uncompressed porosity 96%, compressed in-situ from about 3.2 to 1.6 mm thickness to give porosity about 95%. The TySAR anode reactor was operated for 6 hours under conditions similar to Example 6 to give the result of FIG. 16 (Run 202). In this case the [OH—]/[$CO_3$==] ratio reached only about 0.8 M/M at 1.8 Faraday, compared to 2.2 M/M in Example 6.

Example 8

Figure 17:
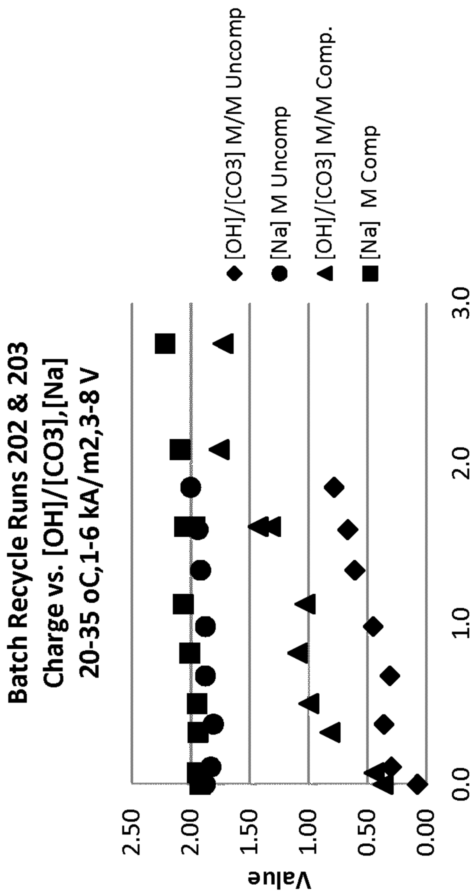

In a test similar to Example 7 the "uncompressed" TySAR was replaced by the same material firmly pre-compressed from 3.2 to 1.2 mm, porosity about 90%. FIG. 17 (Runs 202 & 203) shows results in which the pre-compressed TySAR anode outperforms the "uncompressed" anode with a [OH—]/[$CO_3$==] ratio about 1.9 M/M at 1.8 Faraday. Put together Examples 1, 3 to 8 indicate that reactor performance is affected by the volume, porosity, specific surface and liquid hold-up in the anode. It is speculated this is due in part to the effect of current concentration on the competitive heterogeneous electrochemical and homogenous thermochemical reactions in the anode.

Examination of reactor components at this stage showed some loss of hydrophobicity on gas separation barrier 25, also although the hydrophilic polypropylene was stable in strong hydroxide. Hydrophilic transport barrier 23 slowly lost its wettability by contact with the anode at high current density. In experiments for Examples 9 to 12 the peripheries of the Ti felt (oxidation suppression barrier 5) were insulated to suppress high edge potentials suspected of corroding (i.e. oxidising) gas separation barrier 25 and a porous zirconium oxide textile (Zircar) was inserted between the hydrophilic transport barrier 23 and the anode 24. Zirconium oxide is highly hydrophilic and relatively stable to attack by hydroxide and oxidation in contact with the anode.

Example 9

An electrochemical reactor was assembled as in Example 6, except:

Hydrophilic transport barrier 23: Became one layer of SciMAT plus 1 layer of Zircar ZYW 30A.

The reactor was operated for 10 hours with recycle electrolyte flow about 100 ml/minute, anode-cathode pressure difference about 0.8 kPa and superficial current density up to 9 $kA/m^2$ to give the result shown in FIG. 18 (Run 212). In this case the [OH—]/[$CO_3$==] ratio reached 5 while the integral hydroxide CE went from about 80 to 10%.

Here it is notable that the [OH—]/[$CO_3$==] ratio increases roughly step wise in concert with the current density—implying that current density affects the process selectivity according to the postulates in the Description.

Example 10

An electrochemical reactor was assembled as in Example 9, except:

Hydrophilic transport barrier 23: became four layers: 1 SciMAT+1 PES membrane+1 SciMAT+1 Zircar ZYW 30A.

Operation was as for Example 9 except the electrolyte was 2 M potassium carbonate ($K_2CO_3$) and the superficial current density was held near 6 $kA/m^2$ over 8 hours of operation, with an anode-cathode pressure difference about 2.7 kPa. The results of FIG. 19 (Run 232) show a positive effect of the increased carbonate concentration, where the [OH—]/[$CO_3$==] ratio rises from about 0.1 to 0.9 with an integral hydroxide current efficiency about 50% and corresponding hydroxide concentration near 1 M.

Example 11

An electrochemical reactor was assembled as in Example 9, except:

Hydrophilic transport barrier 23: became five layers: 2 SciMAT+1 PES membrane+1 SciMAT+1 Zircar ZYW 30A.

Anode 24: was changed to the parallel sandwich bi-philic configuration of FIG. 5 in which six pieces of hydrophilic porous Ir/Ru/Ti electrode, each 100×5×2.2 mm, 30% porosity, 100 um pores and 8 um superficial catalyst load are stacked alternately with hydrophobic PTFE mesh intended to promote disengagement of $CO_2$ from the electrolyte in the anode.

Operation over a period of 13 hours was as for Example 10 except the initial electrolyte was 1 M $Na_2CO_3$, flow about 50 ml/minute and superficial current density up to 4 $kA/m^2$. The result of FIG. 20 (Run 234) is a proof of concept for the parallel sandwich anode of FIG. 5, and by extension the idea of a biphilic hydrophilic/hydrophobic configuration promoting gas disengagement from the anode 24A.

Example 12

An electrochemical reactor was assembled and operated as in Example 11, except the initial electrolyte was 3.3 M $K_2CO_3$ and the superficial current density reached about 5 $kA/m^2$. The result of FIG. 21 (Run 236) shows an integral hydroxide current efficiency from 90 to 40%, at which point the [OH—]/[$CO_3$==] ratio of 1.0 corresponds to a hydroxide concentration about 2.6 M.

Examination of the reactor components from Examples 9 to 12 showed relatively little effects from corrosion, presumably due to presence of the titanium felt oxidation suppression barrier 5 and Zircar cloth added to the reactor after Example 8.

Examples 9 to 12 show the electrochemical reactor can operate with sodium (Na) and with potassium (K) based absorbents/electrolytes and cation (Na+, K+) concentrations up to at least about 7 M, [OH—]/[$CO_3$==] ratio up to at least about 5 and hydroxide concentration at least about 3 M. Depending on superficial current density the reactor voltage ranges from about 3 to 10 V while the integral CE for hydroxide hinges on the [OH—]/[$CO_3$==] ratio and ranges from about 90 to 10%. The range of CE indicates the possibility of producing $H_2/CO_2$ mole ratios from about 2 to 6, suitable for the downstream production of fuels, etc.

Example 13

Figure 22:
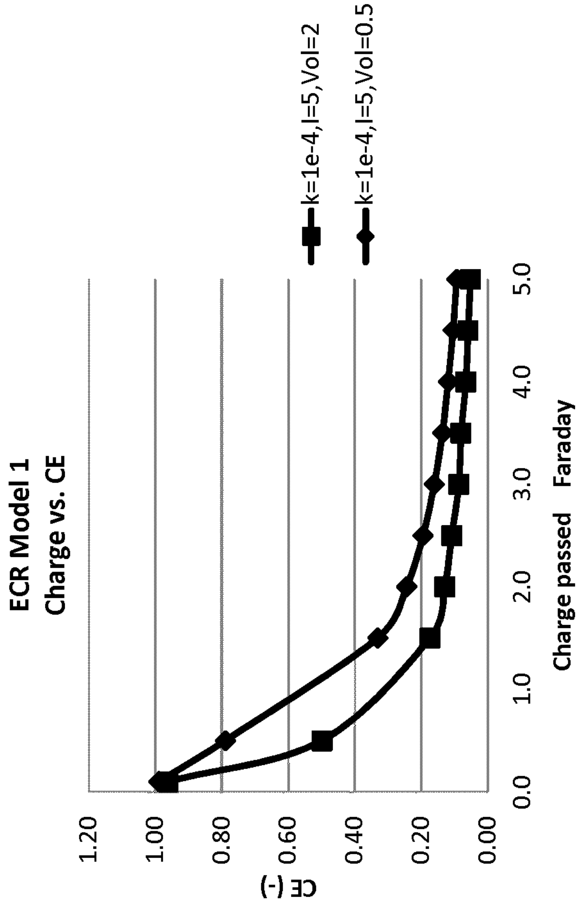
FIG. 22 is a chart of data from a material balance model of the experimental electrochemical reactor embodiment.

FIG. 22 shows hydroxide CE vs. charge calculated in a tentative isothermal material balance for the recycle process of FIG. 9, with conditions similar to those of Examples 1-12. The figure shows charge vs. CE for a fixed current and rate constant in Reaction 8, where CE is increased by decreasing the liquid hold up in the anode (Vol) from 2 to 0.5 ml. The model gives a similar rise in CE when the current is increased from 5 to 10 Amp (2.5 to 5 $kA/m^2$) and a drop in CE when temperature increases from 20 to 50° C. The model accounts for the counterproductive effect of increased temperature on the intrinsic thermochemical kinetics but does not consider effects of temperature on the fluid dynamics and gas/liquid equilibria in the anode, where a higher temperature may promote the evolution of $CO_2$ and increase the CE.

The current and energy efficiencies, operating life, capital cost, operating cost, safety, location, etc. would be important aspects of using an electrochemical reactor/process in a DAC plant. These issues are not considered here, except to note that the experimental data come from apparatus not optimized with respect to materials/configuration/dimensions and operating conditions, nor tested in continuous operation over times longer than 24 hours. Nevertheless it is useful to consider FIG. 22, along with the Examples 1 to 12, which imply that the performance of an electrochemical reactor may be manipulated/improved by careful reactor design with pressure and temperature control, and that integration of a reactor along these lines could benefit the DAC process.

From the above description, examples and elaboration it will be apparent to those “skilled in the art” of process engineering that the electrochemical option offers several possibilities for design and optimization of the coupled absorption and regeneration steps in DAC that are not available in the conventional thermochemical system. However, $CO_2$ absorption catalysts and impurities in the absorbent-electrolyte have not been tested in the electrochemical reactor and their presence in an “industrial” DAC process could affect the electrochemistry and challenge this conjecture.

Although FIGS. 2, 3, 4 and 5 show a flat plate architecture arranged in a horizontal position, the reactors may have other configurations and dispositions, such a tubular reactor in the vertical position.

Note that “Electrochemical reactor” used here is generic and could mean a single cell (one anode/cathode pair), multiple single cells or a multi-cell stack operated in mono or bipolar mode, with fluid flows to reactors and cells in series or parallel.

Reactors may operate in the batch or continuous manner with fluids in plug flow, stirred or otherwise motivated.

Terms used here without explanation have common meanings in chemistry and engineering.

The terminology used herein is for the purpose of describing particular embodiments only and is not intended to be limiting. Accordingly, as used herein, the singular forms “a”, “an” and “the” are intended to include the plural forms as well, unless the context clearly indicates otherwise. It will be further understood that the terms “comprises” and “comprising,” when used in this specification, specify the presence of one or more stated features, integers, steps, operations, elements, and components, but do not preclude the presence or addition of one or more other features, integers, steps, operations, elements, components, and groups. Directional terms such as “top”, “bottom”, “upwards”, “downwards”, “vertically”, and “laterally” are used in the following description for the purpose of providing relative reference only, and are not intended to suggest any limitations on how any article is to be positioned during use, or to be mounted in an assembly or relative to an environment. Additionally, the term “couple” and variants of it such as “coupled”, “couples”, and “coupling” as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

It is contemplated that any part of any aspect or embodiment discussed in this specification can be implemented or combined with any part of any other aspect or embodiment discussed in this specification.

The invention claimed is:

1. An electrochemical reactor for regenerating an alkali metal hydroxide (MOH) and carbon dioxide ($CO_2$) gas from an alkali metal carbonate ($M_2CO_3$) when coupled to a power supply, comprising:

a porous electronically conductive cathode having an inlet for receiving a pressurized electrolyte feed stream comprising MOH, $M_2CO_3$ and $H_2O$, and an outlet for discharging an electrolyte product stream comprising MOH, $M_2CO_3$, $H_2O$ and $H_2$;

a porous electronically insulating hydrophilic transport barrier in adjacent contact with the cathode and configured to regulate the transport of electrolyte species and impede gas flow across the transport barrier;

a porous electronically conductive anode in adjacent contact with the transport barrier and having at least some hydrophilic surface portions and a catalytic surface, porosity, pore size, wettability and thickness in the direction of electric current configured to generate $CO_2$ gas from $M_2CO_3$ while suppressing the combination of the $CO_2$ gas with the MOH;

a porous hydrophobic gas separation barrier in adjacent contact with the anode and configured to regulate the transport of gases including $CO_2$ and impede liquid flow; and a product gas exit channel in adjacent contact with the gas separation barrier and for discharging an anode product stream comprising at least $CO_2$ gas.

2. An electrochemical reactor for regenerating an alkali metal hydroxide (MOH) and carbon dioxide ($CO_2$) gas from an alkali metal carbonate ($M_2CO_3$) when coupled to a power supply, comprising:

an electrolyte flow channel having an inlet for receiving an electrolyte feed stream comprising MOH, $M_2CO_3$ and $H_2O$, and an outlet for discharging an electrolyte product stream comprising MOH, $M_2CO_3$, and $H_2O$;

a porous electronically insulating hydrophilic first transport barrier in adjacent contact with a first side of the electrolyte flow channel and configured to regulate the transport of electrolyte species and impede gas flow across the transport barrier;

a porous electronically conductive hydrophilic cathode in adjacent contact with the first transport barrier;

a porous hydrophobic $H_2$ separation barrier in adjacent contact with the cathode and configured to regulate the transport of gases including $H_2$ and impede liquid flow;

a cathode gas exit channel in adjacent contact with the $H_2$ separation barrier and for discharging a cathode gas stream comprising $H_2$;

a porous electronically insulating hydrophilic second transport barrier in adjacent contact with a second side of the electrolyte flow channel and configured to regulate the transport of electrolyte species and impede gas flow across the barrier;

a porous electronically conductive anode in adjacent contact with the second transport barrier and having at least some hydrophilic surface portions and a catalytic surface, porosity, pore size, wettability and thickness in the direction of electric current configured to generate $CO_2$ gas from $M_2CO_3$ while suppressing the combination of the $CO_2$ gas with the MOH;

a porous hydrophobic gas separation barrier in adjacent contact with the anode and configured to regulate the transport of gases including $CO_2$ and impede liquid flow; and an anode gas exit channel in adjacent contact with the gas separation barrier and for discharging an anode product stream comprising at least $CO_2$ gas.

3. An electrochemical reactor as claimed in claim 1 wherein the anode is entirely hydrophilic.

4. The electrochemical reactor as claimed in claim 1 wherein the anode is a biphilic anode comprising multiple porous hydrophilic electrode portions separated by multiple hydrophobic gas disengagement channels and stacked parallel to a direction of electric current in the electrochemical reactor.

5. The electrochemical reactor as claimed in claim 1 further comprising an oxidation suppression barrier between the anode and the gas separation barrier and composed of a porous electronically conductive and electrochemically inactive material.

6. The electrochemical reactor as claimed in claim 1 wherein the anode has a porosity from 10 to 90 volume %, a pore size from 10 to 1000 micron, a thickness in a direction of electric current from 0.2 to 20 mm, and an air/water wetting angle of hydrophilic regions from 0 to 89° and an air/water capillary pressure of hydrophilic regions at or above 1 kPa.

7. The electrochemical reactor as claimed in claim 1 wherein the gas separation barrier has a porosity from 10 to 90 volume %, a thickness from 0.1 to 5 mm in a direction of electric current, and a capillary pressure air/water from (−1) to (−30) kPa.

8. The electrochemical reactor as claimed in claim 2 wherein at least one of the transport barriers, first transport barrier, or second transport barrier has a porosity from 10 to 90 volume %, a thickness in a direction of electric current between 0.05 and 5 mm, and a coefficient of permeability (in Darcy equation) from 1E-14 to 1E-10 $m^2$.

9. The electrochemical reactor as claimed in claim 1 wherein the concentration of alkali metal carbonate in the pressurized electrolyte feed stream ranges from 0.1 to 10 molar.

10. The electrochemical reactor as claimed in claim 1 further comprising a porous electronically conductive connection plate in adjacent contact with an $O_2$ or $CO_2$ selective membrane, and the $O_2$ or $CO_2$ selective membrane in adjacent contact with the product gas exit channel and for discharging $O_2$ or $CO_2$ gas from an $O_2$ or $CO_2$ gas exit channel.

11. An electrochemical reactor stack comprising multiple electrochemical reactors, wherein a first electrochemical reactor is as claimed in claim 10, and wherein the discharged $O_2$ or $CO_2$ gas from the first electrochemical reactor is fed to an adjacent second electrochemical reactor to depolarize a cathode of the second electrochemical reactor.

12. An electrochemical reactor stack comprising multiple electrochemical reactors, wherein a first electrochemical reactor is as claimed in claim 2, and wherein the discharged gas stream comprising $H_2$ from the first electrochemical reactor is fed to an adjacent second electrochemical reactor to depolarize an anode of the second electrochemical reactor.

13. An electrochemical reactor as claimed in claim 1 wherein the porous electronically conductive cathode is a single-electrolyte flow chamber.

14. The electrochemical reactor as claimed in claim 1 wherein the alkali metal comprises a cation selected from a group consisting of: sodium, potassium, rubidium and caesium, or a mixture thereof.

15. A direct air capture (DAC) system comprising:

(a) an electrochemical reactor for regenerating an alkali metal hydroxide (MOH) and carbon dioxide ($CO_2$) gas from an alkali metal carbonate ($M_2CO_3$) when coupled to a power supply, comprising:

(i) a porous electronically conductive cathode having an inlet for receiving a pressurized electrolyte feed stream comprising MOH, $M_2CO_3$ and $H_2O$, and an outlet for discharging an electrolyte product stream comprising MOH, $M_2CO_3$, $H_2O$ and $H_2$;

(ii) a porous electronically insulating hydrophilic transport barrier in adjacent contact with the cathode and configured to regulate the transport of electrolyte species and impede gas flow across the transport barrier;

(iii) a porous electronically conductive anode in adjacent contact with the transport barrier and having at least some hydrophilic surface portions and a catalytic surface, porosity, pore size, wettability and thickness in the direction of electric current configured to generate $CO_2$ gas from $M_2CO_3$ while suppressing the combination of the $CO_2$ gas with the MOH;

(iv) a porous hydrophobic gas separation barrier in adjacent contact with the anode and configured to regulate the transport of gases including $CO_2$ and impede liquid flow; and (v) a product gas exit channel in adjacent contact with the gas separation barrier and for discharging an anode product stream comprising at least $CO_2$ gas; and (b) a $CO_2$ absorber comprising an alkali metal hydroxide and carbonate absorbent for contacting with air to produce a spent absorbent comprising carbonate in an alkali metal hydroxide and carbonate stream, the $CO_2$ absorber further comprising an absorbent outlet fluidly coupled to the cathode inlet to supply the spent absorbent to the electrochemical reactor, and an absorber inlet fluidly coupled with the cathode outlet to receive the electrolyte product stream from the electrochemical reactor.

16. The DAC system as claimed in claim 15 further comprising:

a mixer having inlets fluidly coupled to the absorbent outlet and the electrochemical reactor cathode outlet and wherein the spent absorbent stream and electrolyte product stream are mixed into a mixed stream; and a flow divider having an inlet fluidly coupled to the mixer to receive the mixed stream, and a pair of outlets for respectively discharging the mixed stream as a regenerated absorbent stream into the $CO_2$ absorber and as the electrolyte feed stream into the electrochemical reactor.

17. The DAC system as claimed in claim 15 wherein the anode product stream comprises $O_2$ and $CO_2$ gases, and the DAC system further comprises a $CO_2/O_2$ separator having an inlet fluidly coupled with the anode product stream and $CO_2$ and $O_2$ outlets for discharging $CO_2$ and $O_2$ gases respectively.

18. The DAC system as claimed in claim 17 further comprising:

an $H_2$ separator having an inlet fluidly coupled to the cathode outlet for receiving the electrolyte product stream, an $H_2$ outlet for discharging $H_2$ gas separated from the electrolyte product stream, and an alkali metal hydroxide and carbonate outlet fluidly coupled to the absorber inlet for discharging an alkali metal hydroxide and carbonate stream; and an oxidation reactor coupled with the electrochemical reactor product gas exit channel or to the $CO_2/O_2$ separator $O_2$ outlet to receive the anode product stream or the $O_2$ gas as oxidant, and fluidly coupled with the separator $H_2$ outlet to receive the $H_2$ gas as fuel.

19. A direct air capture (DAC) system comprising:

(a) an electrochemical reactor for regenerating an alkali metal hydroxide (MOH) and carbon dioxide ($CO_2$) gas from an alkali metal carbonate ($M_2CO_3$) when coupled to a power supply, comprising:

(i) an electrolyte flow channel having an inlet for receiving an electrolyte feed stream comprising MOH, $M_2CO_3$ and $H_2O$, and an outlet for discharging an electrolyte product stream comprising MOH, $M_2CO_3$, and $H_2O$;

(ii) a porous electronically insulating hydrophilic first transport barrier in adjacent contact with a first side of the electrolyte flow channel and configured to regulate the transport of electrolyte species and impede gas flow across the transport barrier;

(iii) a porous electronically conductive hydrophilic cathode in adjacent contact with the first transport barrier;

(iii) a porous hydrophobic $H_2$ separation barrier in adjacent contact with the cathode and configured to regulate the transport of gases including $H_2$ and impede liquid flow;

(iv) a cathode gas exit channel in adjacent contact with the $H_2$ separation barrier and for discharging a cathode gas stream comprising $H_2$;

(v) a porous electronically insulating hydrophilic second transport barrier in adjacent contact with a second side of the electrolyte flow channel and configured to regulate the transport of electrolyte species and impede gas flow across the barrier;

(vi) a porous electronically conductive anode in adjacent contact with the second transport barrier and having at least some hydrophilic surface portions and a catalytic surface, porosity, pore size, wettability and thickness in the direction of electric current configured to generate $CO_2$ gas from $M_2CO_3$ in the presence of MOH while suppressing the combination of the $CO_2$ gas with the MOH;

(vii) a porous hydrophobic gas separation barrier in adjacent contact with the anode and configured to regulate the transport of gases including $CO_2$ and $O_2$ and impede liquid flow; and (viii) an anode gas exit channel in adjacent contact with the gas separation barrier and for discharging an anode product stream comprising at least $O_2$ and $CO_2$ gases, (b) a $CO_2$ absorber comprising an absorbent, the absorbent comprising an alkali metal hydroxide and carbonate for contacting with air to produce a spent absorbent stream, the $CO_2$ absorber further comprising an absorber outlet fluidly coupled with the electrolyte flow channel inlet to supply the spent absorbent stream into the electrolyte feed stream, and an absorber inlet fluidly coupled with the electrolyte flow channel outlet to receive the electrolyte product stream into the absorbent; and (c) an oxidation reactor fluidly coupled with the anode gas exit channel to receive the anode product stream as oxidant, and fluidly coupled with the cathode gas exit channel to receive the cathode gas stream as fuel.

20. The DAC system as claimed in claim 18 wherein the oxidation reactor is a fuel cell or a gas burner.

* * * * *